(12) United States Patent
Yoon et al.

(10) Patent No.: US 12,438,400 B2
(45) Date of Patent: Oct. 7, 2025

(54) WEARABLE ELECTRONIC DEVICE AND ELECTRONIC DEVICE CHARGING THE SAME

(71) Applicant: Samsung Electronics Co., Ltd., Gyeonggi-do (KR)

(72) Inventors: Jongmin Yoon, Gyeonggi-do (KR); Doukyoung Song, Gyeonggi-do (KR); Seungnyun Kim, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

(21) Appl. No.: 17/724,624

(22) Filed: Apr. 20, 2022

(65) Prior Publication Data
US 2022/0329110 A1 Oct. 13, 2022

Related U.S. Application Data

(63) Continuation of application No. PCT/KR2022/004877, filed on Apr. 5, 2022.

(30) Foreign Application Priority Data

Apr. 5, 2021 (KR) .................. 10-2021-0043962

(51) Int. Cl.
*H02J 7/04* (2006.01)
*A45C 11/04* (2006.01)
(Continued)

(52) U.S. Cl.
CPC ............ *H02J 50/402* (2020.01); *A45C 11/04* (2013.01); *G02C 5/14* (2013.01); *G02C 11/10* (2013.01);
(Continued)

(58) Field of Classification Search
None
See application file for complete search history.

(56) References Cited

U.S. PATENT DOCUMENTS

| 5,455,637 A | 10/1995 | Kallman et al. |
| 10,003,880 B2 | 6/2018 | Wagman et al. |

(Continued)

FOREIGN PATENT DOCUMENTS

| CN | 203369502 U | 1/2014 |
| CN | 104337170 A | 2/2015 |

(Continued)

OTHER PUBLICATIONS

Written Opinion dated Jul. 12, 2022.
International Search Report dated Jul. 13, 2022.

*Primary Examiner* — Arun C Williams
(74) *Attorney, Agent, or Firm* — Cha & Reiter, LLC.

(57) ABSTRACT

Disclosed is an electronic device. The electronic device may include a housing forming a first space configured to seat an external electronic device and a second space, a battery storing power, a support part disposed within the first space and configured to support the external electronic device when the external electronic device is seated in the electronic device, a first antenna and a second antenna disposed in the support part, a third antenna disposed in the second space and configured to receive a first magnetic field from the outside of the housing and to supply power to the battery. The battery may be disposed in the second space. The battery may radiate a second magnetic field to at least some area of the first space by supplying power to at least one of the first antenna and the second antenna.

6 Claims, 21 Drawing Sheets

(51) Int. Cl.
- *G02C 5/14* (2006.01)
- *G02C 11/00* (2006.01)
- *H01Q 7/00* (2006.01)
- *H02J 7/00* (2006.01)
- *H02J 50/12* (2016.01)
- *H02J 50/40* (2016.01)

(52) U.S. Cl.
CPC ............ *H01Q 7/00* (2013.01); *H02J 7/0068* (2013.01); *H02J 7/007* (2013.01); *H02J 50/12* (2016.02)

(56) References Cited

U.S. PATENT DOCUMENTS

| | | | |
|---|---|---|---|
| 10,624,790 B2* | 4/2020 | Chao | G02C 7/16 |
| 10,993,515 B1* | 5/2021 | Kim | A45C 11/04 |
| 11,233,411 B2 | 1/2022 | Steger et al. | |
| 2012/0235883 A1 | 9/2012 | Border et al. | |
| 2015/0200554 A1 | 7/2015 | Marks et al. | |
| 2019/0033622 A1* | 1/2019 | Olgun | H04B 1/385 |
| 2019/0272800 A1 | 9/2019 | Tao et al. | |
| 2019/0318589 A1* | 10/2019 | Howell | H04W 4/029 |
| 2019/0379216 A1 | 12/2019 | Yoon et al. | |
| 2020/0383441 A1 | 12/2020 | Kan et al. | |
| 2021/0055565 A1* | 2/2021 | Moore | G02C 11/10 |
| 2021/0124175 A1* | 4/2021 | Lee | G01B 7/30 |
| 2021/0389605 A1 | 12/2021 | Kan et al. | |

FOREIGN PATENT DOCUMENTS

| | | |
|---|---|---|
| CN | 209547273 U | 10/2019 |
| JP | 2018-33275 A | 3/2018 |
| JP | 2018/066346 A1 | 4/2018 |
| KR | 10-2017-0039569 A | 4/2017 |
| KR | 10-2018-0073270 A | 7/2018 |
| KR | 10-2019-0054144 A | 5/2019 |
| WO | 2019/059220 A1 | 3/2019 |

* cited by examiner

WEARABLE ELECTRONIC DEVICE AND ELECTRONIC DEVICE CHARGING THE SAME

CROSS-REFERENCE TO RELATED APPLICATION(S)

This application is a Continuation of and claims priority under 35 U.S.C. § 120 to PCT International Application No. PCT/KR2022/004877, which was filed on Apr. 5, 2022, and claims priority to Korean Patent Application No. 10-2021-0043962, filed on Apr. 5, 2021, in the Korean Intellectual Property Office, the disclosure of which are incorporated by reference herein their entirety.

BACKGROUND

Technical Field

One or more embodiments disclosed in this document generally relate to a glasses-type wearable electronic device and to an electronic device capable of keeping or charging the glasses-type wearable electronic device.

Description of Related Art

In order to implement virtual reality (VR) and augmented reality (AR), various wearable electronic devices may be connected to portable wireless electronic devices, such as smartphones, through wireless communication. In one example, such a wearable electronic device may be implemented as a pair of glasses, and is also referred to as mixed reality (XR) glasses.

In order to implement AR in the glasses-type wearable electronic device, images may be displayed on the lenses of glasses. The images may be displayed on the lenses of glasses by projecting light onto the lenses. For example, a projector having very small size (e.g., micro projector or pico projector) may be used. An example of such a projector may include a laser scanning display (LSD), a raster/retinal scanning display (RSD), a digital micro-mirror display (DMD) or liquid crystal on silicon (LCoS). Furthermore, images may be displayed on the lenses by using a transparent display.

An electronic device for charging, which is used to charge another electronic device may be connected to the other electronic device through wires or wirelessly, and may deliver power to the other electronic device, which is the target of charging. The delivery of the power may be performed in a way that the electronic device for charging is supplied with power from an external power source, converts the power (e.g. converts the voltage), and delivers the converted power to the other electronic device. Alternatively, the electronic device for charging may deliver power stored therein to the other electronic device connected thereto. Wireless charging, which provides electric field and/or magnetic field to the other electronic device, has recently been used to charge various electronic devices.

SUMMARY

In the case for the glasses-type wearable electronic device, the locations of the legs of the glasses may vary depending on how the legs of the glasses are folded. If wireless charging antennas are to be mounted on the legs of the left and right glasses, the locations of the wireless charging antennas may vary depending on how the legs of the glasses are folded. There may be a need for a charging case and control of the charging operation to account for varying distances between transmission and reception antennas and a method to identically maintain the same distance for multiple pairs of transmission antennas and reception antennas so that charging performance can be balanced.

In an embodiment disclosed in this document, an electronic device may include a housing forming a first space configured to seat an external electronic device and a second space, a battery configured to store power, a support part disposed within the first space and configured to support the external electronic device when the external electronic device is seated in the electronic device, a first antenna and a second antenna disposed in the support part, a third antenna disposed in the second space and configured to receive a first magnetic field from the outside of the housing and to supply power to the battery. The battery may be disposed in the second space, and may be electrically connected to the first antenna, the second antenna, and the third antenna. The battery may radiate a second magnetic field to at least some area of the first space by supplying power to at least one of the first antenna and the second antenna.

In an embodiment disclosed in this document, an electronic device may include a housing forming a first space configured to seat an external electronic device, the external electronic device including a first leg member and a second leg member capable of being sequentially folded, a battery configured to store power, a first antenna and a second antenna disposed in the first space of the housing and configured to receive power from the battery and radiate a first magnetic field, a third antenna configured to receive a second magnetic field from outside of the housing and to supply power to the battery, and a processor operatively connected to the first antenna, the second antenna, the third antenna, and the battery. The processor may be configured to identify whether the external electronic device has been seated in the electronic device, identify a folding order of the first leg member and the second leg member included in the external electronic device, and control charging based on the folding order.

In an embodiment disclosed in this document, an electronic device may include a main body part, a pair of lenses supported by the main body part, at least one display module disposed in the main body part, a first leg member rotatably connected to the main body part, a second leg member rotatably connected to the main body part and spaced apart from the first leg member, a communication module configured to establish a communication connection with an external electronic device, a sensor module including one or more sensors, and a processor operatively connected to the communication module and the sensor module. The first leg member and the second leg member may be disposed so that one of the first leg member and the second leg member is first rotated and folded and another of the first leg member and the second leg member is then sequentially rotated and folded. The processor may be configured to generate folding order information by detecting a folding order of the first and second leg members by using the sensor module based on the first leg member and the second leg member being rotated and folded and to transmit the folding order information to the external electronic device.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

In relation to the description of the drawings, the same or similar reference numerals may be used with respect to the same or similar constituent elements.

DETAILED DESCRIPTION

According to certain embodiments, a charging case and a charging method capable of wirelessly charging a glasses-type wearable electronic device may be provided.

According to certain embodiments, the electronic device may include a structure suitable for wirelessly charging a glass-type wearable device because the electronic device includes one reception antenna for the charging of a charging device and two transmission antennas for charging the glass-type wearable device.

According to certain embodiments, the same level of power can be provided to both legs of the glass-type wearable device through a wireless charging transmission antenna structure of the case and/or movement of the antenna, regardless of the direction in which the legs of the glass-type wearable device are folded.

According to certain embodiments, usability can be increased because the same amount of time is taken to charge left and right batteries of the glass-type wearable device. This may be done through control of wireless charging output from a charging device according to the state in which the legs of the glass-type wearable device are folded and state of the battery.

Figure 1:
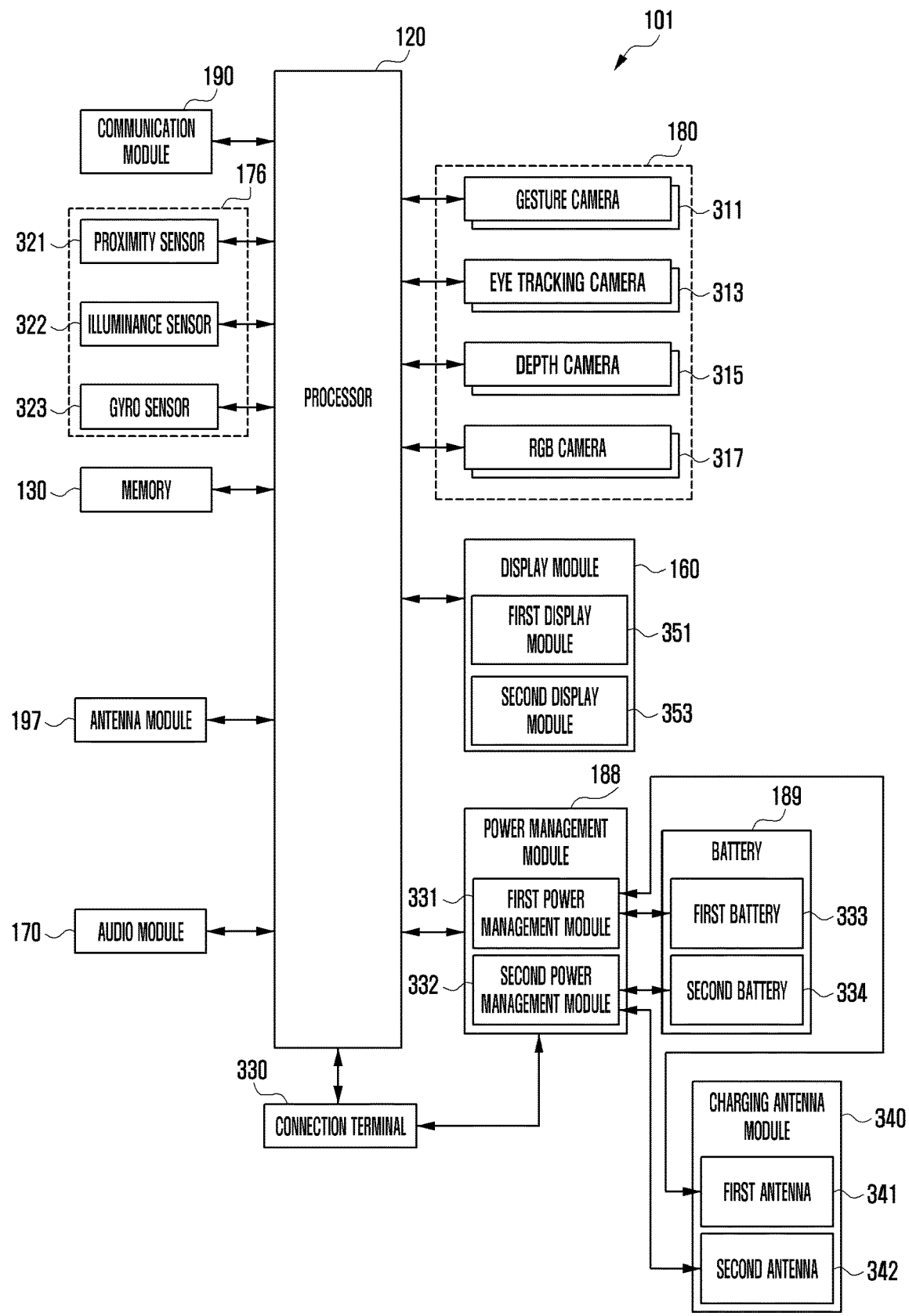
FIG. 1 is a block diagram of a wearable device according to an embodiment.

FIG. 1 is a block diagram of a wearable device 101 according to an embodiment.

With reference to FIG. 1, the wearable device 101 may include a processor 120, a memory 130, a display module 160, an audio module 170, a sensor module 176, a camera module 180, a power management module 188, a battery 189, a communication module 190, an antenna module 197 and/or a charging antenna module 340. According to an embodiment, the wearable device 101 may be connected to an external electronic device (not illustrated) through a connection terminal 330 (e.g., USB TYPE-C). For example, the power management module 188 of the wearable device 101 may receive power from the external electronic device through the connection terminal 330, and may charge the battery 189. Furthermore, for example, the processor 120 of the wearable device 101 may perform power line communication with the external electronic device through the connection terminal 330. Furthermore, for example, the power management module 188 of the wearable device 101 may wirelessly receive power from the external electronic device through the charging antenna module 340, and may charge the battery 189. According to an embodiment, the wearable device 101 may consist of a main body part (e.g., main body part 223 in FIG. 2) and a leg member (e.g., first leg member 221 and/or second leg member 222 in FIG. 2). According to an embodiment, the components of the wearable device 101 may be disposed the main body part 223 or the leg members 221 and 222.

According to an embodiment, the processor 120 may control at least another component (e.g., a hardware or software component) by executing a program stored in the memory 130, and may perform various data processing and operations. According to an embodiment, the processor 120 may provide AR service to a user. The processor 120 may output at least one virtual object in a space on the screen that corresponds to an actual space in the field of view (FoV) of the user who is wearing the wearable device 101 through the display module 160 so that the at least one virtual object is seen as being added to the actual space. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the memory 130 may store various data used by at least one component (e.g., the processor 120 or the sensor module 176) of the wearable device 101. The data may include software (e.g., program) and input data or output data for an instruction related to the software, for example. The memory 130 may include a volatile memory (not illustrated) or a nonvolatile memory (not illustrated).

The display module 160 may visually provide information to, for example, the user of the wearable device 101. The display module 160 may be implemented as a display, a hologram device, or a projector and a control circuit for controlling a corresponding device, for example. According to an embodiment, the display module 160 of the wearable device 101 may include at least one glass (e.g., first glass 220 in FIG. 2 and/or second glass 230 in FIG. 2). According to an embodiment, the first glass 220 may include at least a part of a first display module 351. The second glass 230 may include at least a part of a second display module 353. For example, each of the first display module 351 and/or the second display module 353 may include a display panel. The display panel may be configured with a transparent element so that the user can view his or her surroundings through the display module 160. The display module 160 may display at least one virtual object in at least a part of the display panel so that the virtual object is seen as being added to the actual surrounding of the user who is wearing the wearable device 101. For example, the FoV of a user may include an angle and/or a range at/in which the user can recognize various objects. According to an embodiment, the display module 160 may include the first display module 351 corresponding to the left eye of the user and/or the second display module 353 corresponding to the right eye thereof. According to an embodiment, the processor 120 may load, from the memory 130, configuration information (e.g., resolution, frame rate, the size of the display area and/or sharpness) related to performance of the display module 160, and may adjust the performance of the display module 160 based on the configuration information. According to an embodiment, configuration information of each of the display panels included in the display module 160 may be individually determined. For example, a first display panel corresponding to the left eye may be configured based on first configuration information. A second display panel corresponding to the right eye may be configured based on second configuration information. According to another embodiment, at least a part of one of the display panels included in the display module 160 may be differently configured based on the configuration information. For example, the wearable device 101 may differently configure at least one of resolution, frame rate and/or sharpness for two display panels of the display module 160. According to an embodiment, the wearable device 101 can reduce consumption power by at least partially changing the configurations of the display module 160.

According to an embodiment, the audio module 170 may convert sound into electrical signals or electrical signals into sound based on control of the processor 120. For example, the audio module 170 may include a speaker 232-1, 232-2 in FIG. 2 and a microphone 241 in FIG. 2.

The sensor module 176 may detect an operating state (e.g., power or temperature) or external environment state (e.g., a user state) of the wearable device 101, and may generate an electrical signal or data value corresponding to the detected state. According to an embodiment, the sensor module 176 of the wearable device 101 may include a proximity sensor 321, an illuminance sensor 322 and/or a gyro sensor 323. According to an embodiment, the proximity sensor 321 may detect an object adjacent to the wearable device 101. The illuminance sensor 322 may measure the degree of brightness around the wearable device 101. According to an embodiment, the processor 120 may identify the degree of brightness around the wearable device 101 by using the illuminance sensor 322, and may change configuration information related to brightness of the display module 160 based on the degree of brightness. For example, when surrounding brightness is brighter than preset brightness, the processor 120 may set the degree of brightness of the display module 160 to be higher so that the visibility by the user is improved. According to an embodiment, the gyro sensor 323 may detect the posture and location of the wearable device 101. For example, the gyro sensor 323 may detect whether the wearable device 101 has been correctly worn on the head of the user. Furthermore, for example, the gyro sensor 323 may detect movement of the wearable device 101 or the user is wearing the wearable device 101. Furthermore, for example, the gyro sensor 323 may detect the movement of a leg member (e.g., the first leg member 221 and/or the second leg member 222 in FIG. 2) of the wearable device 101. According to an embodiment, the sensor module 176 of the wearable device 101 may include an acceleration sensor (e.g., first sensor 701 and/or second sensor 702 in FIG. 16) and/or a Hall sensor (e.g., third sensor 703 and/or fourth sensor 704 in FIG. 17). According to an embodiment, the acceleration sensor may detect movement of a leg member (e.g., the first leg member 221 and/or the second leg member 222 in FIG. 2) of the wearable device 101. According to an embodiment, the Hall sensor may detect movement of a leg member (e.g., the first leg member 221 and/or the second leg member 222 in FIG. 2) of the wearable device 101 by detecting a change in the magnetic field.

Figure 4:
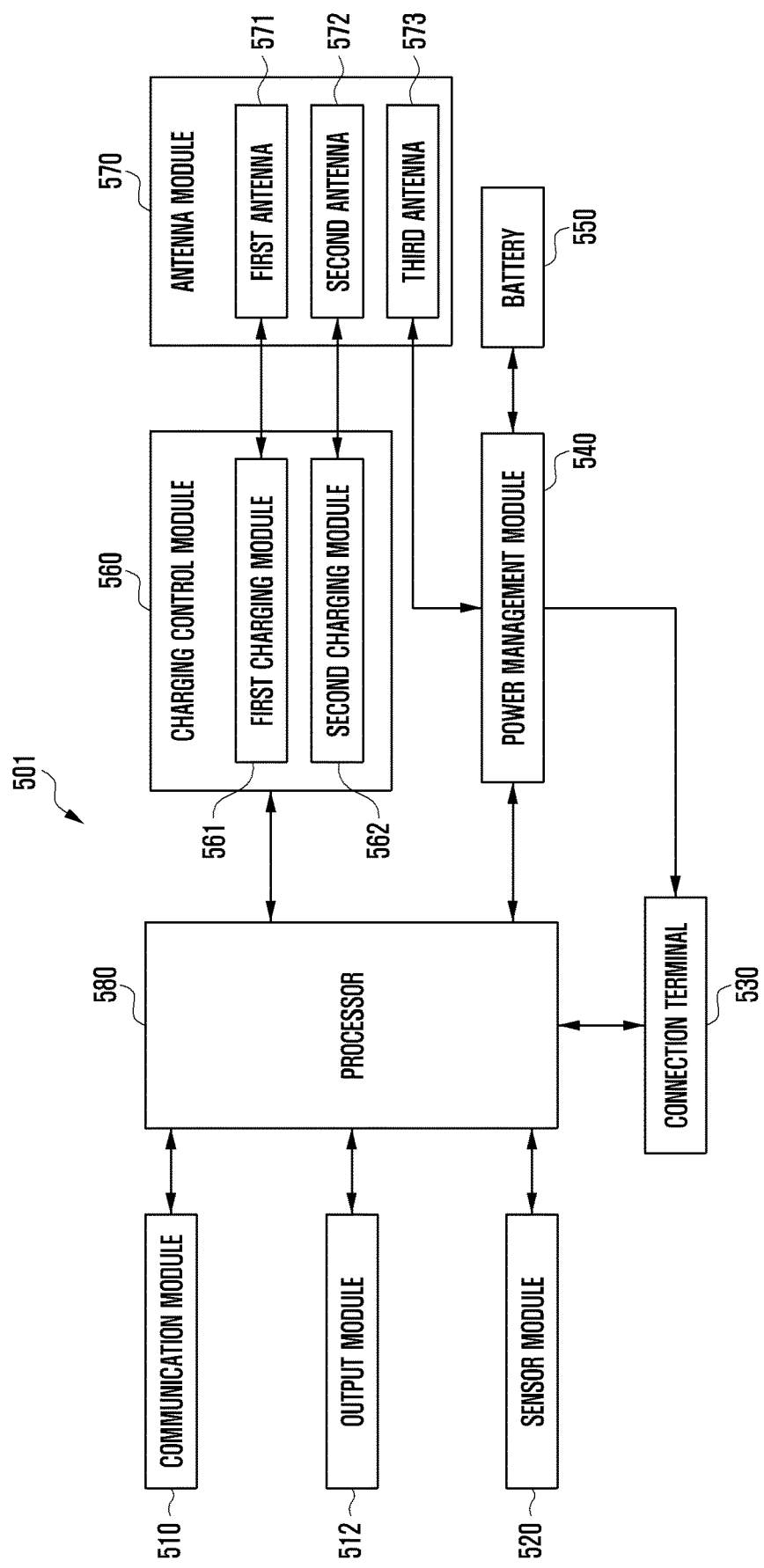
FIG. 4 is a block diagram of a charging device according to an embodiment.

The communication module 190 may establish a direct (e.g., wired) communication channel or a wireless communication channel between the wearable device 101 and an external electronic device (e.g., portable electronic device and/or charging device 501 in FIG. 4), and may support the execution of communication through the established communication channel. The communication module 190 may include at least one communication processor which is operated independently of the processor 120 (e.g., an application processor) and supports direct (e.g., wired) communication or wireless communication. According to an embodiment, the wearable device 101 may perform wireless communication with another electronic device (not illustrated) through the communication module 190 (e.g., a wireless communication circuit). For example, the wearable device 101 may perform wireless communication with a portable electronic device (e.g., smartphone) and exchange instructions and/or data with the portable electronic device (e.g., smartphone). According to an embodiment, the wearable device 101 may be at least partially controlled by an external electronic device (e.g., the portable electronic device). For example, at least one function of the wearable device 101 may be performed under the control of the external electronic device.

The antenna module 197 may transmit signals or power to the outside of the device (e.g., to an external electronic device) or may receive signals or power from the outside. According to an embodiment, the antenna module 197 may include an antenna that in turn includes a radiator composed of a conductor or a conductive pattern formed on a substrate (e.g., PCB). According to an embodiment, the antenna module 197 may include a plurality of antennas (e.g., array antenna). Signal or power may be transmitted or received between the wearable device 101 and the external electronic device through at least one selected antenna of the plurality of antennas. According to an embodiment, in addition to the radiator, another part (e.g., radio frequency integrated circuit (RFIC)) may additionally implement the antenna module 197.

According to an embodiment, the wearable device 101 may change at least some of the configurations of the display panel based on control from another electronic device connected thereto wirelessly and/or through wires. According to an embodiment, the wearable device 101 may transmit, to the other electronic device, information (e.g., information on the distance from an object disposed in the user's surroundings, information on the tracking of an eye of the user and/or information on a gesture of the user) related to primary sightedness/auxiliary sightedness obtained through a camera (e.g., the camera module 180) of the wearable device 101. The other electronic device may transmit, to the wearable device 101, configuration information of the display panel included in the glasses (e.g., the first glass 220 and/or the second glass 230) corresponding to detected primary sightedness or auxiliary sightedness, based on information related to the primary sightedness/auxiliary sightedness received from the wearable device 101. The wearable device 101 may change at least some of the configurations of the display panel based on the configuration information of the display panel received from the other electronic device. For example, the configuration of the display panel may be changed to lower quality of the display panel, and at least some of the configuration of the display panel may be changed to the extent that the user cannot feel the change. According to an embodiment, the wearable device 101 may reduce resolution of the display panel, may reduce the frame rate thereof, or may adjust the size of the display area and location of the display panel.

The camera module 180 may photograph still images and moving images. According to an embodiment, the camera module 180 may include at least one lens, image sensors, image signal processors, or flashes. According to an embodiment, the camera module 180 of the wearable device 101 may include a gesture camera 311, an eye tracking camera 313, a depth camera 315 and/or a red green blue (RGB) camera 317. According to an embodiment, the gesture camera 311 may detect movement of the user. Cameras 211-1 and 211-2 for recognition in FIG. 2 may include the gesture camera 311. For example, at least one gesture camera 311 may be disposed in the wearable device 101, and may detect movement of a hand of the user within a preset distance. The gesture camera 311 may include a simultaneous localization and mapping (SLAM) camera for recognizing information (e.g., location and/or direction) related to a space around the wearable device 101. A gesture recognition area of the gesture camera 311 may be set based on the possible photographing range of the gesture camera 311. According to an embodiment, the eye tracking camera 313 (e.g., eye tracking camera 212 in FIG. 2) may track movements of the left eye and right eye of the user. According to an embodiment, the processor 120 may identify the gaze direction of the left eye and the gaze direction of the right eye by using the eye tracking camera 313. For example, the eye tracking camera 313 may include a first eye tracking camera 212-1 for identifying the gaze direction of the left eye and a second eye tracking camera 212-2 for identifying the gaze direction of the right eye. According to an embodiment, the processor 120 may identify primary sightedness and auxiliary sightedness based on the gaze direction of the left eye and the gaze direction of the right eye. According to an embodiment, the depth camera 315 may measure the distance from an object disposed in front of the wearable device 101. The camera 213 for photographing in FIG. 2 may include the depth camera 315. The depth camera 315 may include a time of flight (TOF) camera and/or a depth camera. According to an embodiment, the depth camera 315 may photograph the front direction of the wearable device 101. The eye tracking camera 313 may photograph the direction opposite to a photographing direction of the depth camera 315. According to another embodiment, the wearable device 101 may measure the distance from an object in the user's surroundings by using the depth camera 315, and may change a configuration of a display panel when the distance is equal to or greater than a threshold value. For example, when the distance from the object is close, that is, a threshold value or less, the wearable device 101 may maintain display performance of a display panel. According to an embodiment, the wearable device 101 may recognize one of objects disposed in the gaze direction (e.g., FoV) in which the user sees the objects by using the eye tracking camera 313, and may calculate depth, that is, the distance from the corresponding object, through the depth camera or may measure the distance from the corresponding object through a TOF camera. According to an embodiment, the RGB camera 317 may detect information related to the colors of an object and information on the distance from the object. According to an embodiment, the wearable device 101 may integrate the depth camera 315 and the RGB camera 317. For example, the camera 213 for photographing in FIG. 2 may include the depth camera 315 and/or the RGB camera 317. According to an embodiment, each of the gesture camera 311, the eye tracking camera 313, the depth camera 315 and/or the RGB camera 317 included in the camera module 180 may be included in the wearable device 101 or some of them may be implemented as a single integrated camera. For example, the depth camera 315 and the RGB camera 317 may be implemented as one integrated camera.

According to an embodiment, the power management module 188 may manage power supplied to the wearable device 101. The power management module 188 may include a plurality of power management modules (e.g., first power management module 331 and second power management module 332). At least some of the first power management module 331 or the second power management module 332 may be directly connected to the processor 120 and supplied with power therefrom. At least some of the first power management module 331 or the second power management module 332 may receive power from an external electronic device through the connection terminal 330 (e.g., TYPE-C) and charge the battery 189 or may supply power to other components of the wearable device 101. According to an embodiment, the wearable device 101 may receive power from an external electronic device through wireless charging and charge the battery 189. According to an embodiment, the wearable device 101 may wirelessly receive external power from the charging antenna module 340. According to an embodiment, the power management module 188 may be electrically connected to components (e.g., the memory 130, the display module 160, the audio module 170, the sensor module 176, the camera module 180 and/or the communication module 190) of the wearable device 101. For example, the power management module 188 may provide power of the battery 189 to components of the wearable device 101 based on control of the processor 120. According to an embodiment, the wearable device 101 may receive power from a first battery 333 through the first power management module 331, and may receive power from a second battery 334 through the second power management module 332. According to an embodiment, the processor 120 may manage power to be consumed by at least partially changing a configuration of the display module 160 based on information obtained using the at least one camera 311, 313, 315, and 317 included in the camera module 180.

The battery 189 may supply power to at least one component of the wearable device 101. According to an embodiment, the battery 189 may include a primary cell that cannot be recharged, a rechargeable secondary cell or a fuel cell, for example. According to an embodiment, the battery 189 may be charged by being supplied with power or may be discharged by providing power under the control of the power management module 188. According to an embodiment, the battery 189 may include a plurality of batteries (e.g., the first battery 333 and the second battery 334). For example, the plurality of batteries (e.g., the first battery 333 and the second battery 334) may be disposed in the main body part 223 and a leg member (e.g., the first leg member 221 and/or the second leg member 222). According to an embodiment, the first battery 333 may be disposed in the first leg member 221, and the second battery 334 may be disposed in the second leg member 222.

The charging antenna module 340 may receive power from the outside of the wearable device 101. According to an embodiment, the charging antenna module 340 may be implemented as part of the antenna module 197. According to an embodiment, the charging antenna module 340 may include a loop type antenna and/or a coil type antenna. According to an embodiment, the charging antenna module 340 may include a plurality of antennas (e.g., first antenna 341 and second antenna 342). For example, a plurality of antennas (e.g., the first antenna 341 and the second antenna 342) may receive magnetic field and/or electromagnetic field from the outside, and may deliver, to the power management module 188 and/or the battery 189, current generated through magnetic induction and/or magnetic resonance attributable to the external magnetic field and/or electromagnetic field. According to an embodiment, a plurality of antennas (e.g., the first antenna 341, the second antenna 342) may be disposed in the main body part 223 and a leg member (e.g., the first leg member 221 and/or the second leg member 222). According to an embodiment, the first antenna 341 may be disposed in the first leg member 221, and the second antenna 342 may be disposed in the second leg member 222.

According to an embodiment, the processor 120 may process an operation or data relating to control and/or communication of each of the components of the wearable device 101. The processor may be connected to components of the wearable device 101, such as the communication module 190, the sensor module 176 and the memory 130 operatively, electrically and/or functionally. Each of operations of the processor 120 according to certain embodiment may be performed in real time. The type and/or amount of operations, calculations, and data processing which may be performed by the processor 120 will not be limited. However, in this document, only the configuration and function of the processor 120 for controlling the charging of the wearable device 101 according to certain embodiments are described.

According to an embodiment, the processor 120 of the wearable device 101 may identify a folding order. The folding order may be information about the order in which the plurality of leg members (e.g., the first leg member 221 and the second leg member 222 in FIG. 2) included in the wearable device 101 are folded. According to an embodiment, the first leg member 221 and the second leg member 222 may be sequentially folded. For example, the folding order may be the first leg member 221 being folded first and the second leg member 222 being folded second or vice versa. According to an embodiment, the processor 120 of the wearable device 101 may detect movement of a leg member (e.g., the first leg member 221 and/or the second leg member 222) by using a sensor (e.g., the sensor module 176 in FIG. 1, the first sensor 701 or the second sensor 702 in FIG. 16, the third sensor 703 and/or the fourth sensor 704 in FIGS. 17 and/or 18). According to an embodiment, the processor 120 may detect acceleration and/or movement direction of the first leg member 221 and/or the second leg member 222 by using a sensor (e.g., the first sensor 701 and/or the second sensor 702 in FIG. 16). According to an embodiment, the sensor (e.g., the first sensor 701 and/or the second sensor 702 in FIG. 16) may include an acceleration sensor and/or a gyro sensor. The processor 120 may detect change in the acceleration and/or movement of the first leg member 221 and/or the second leg member 222. The processor 120 may identify the folding order of the leg members of the wearable device 101 based on the change in the acceleration and/or movement of the first leg member 221 and/or the second leg member 222. According to an embodiment, the processor 120 may detect movement of the first leg member 221 and/or the second leg member 222 by using a sensor (e.g., the third sensor 703 and/or the fourth sensor 704 in FIGS. 17 and/or 18). According to an embodiment, the sensor (e.g., the third sensor 703 and/or the fourth sensor 704 in FIGS. 17 and/or 18) may include a magnetic field sensor. The processor 120 may identify information on change in the magnetic field, which is detected by the magnetic field sensor, and may identify the folding order of the leg members of the wearable device 101. According to an embodiment, the processor 120 may store, in a memory (e.g., the memory 130 in FIG. 1), folding order information about the identified folding order.

According to an embodiment, the processor 120 of the wearable device 101 may identify whether the charging device 501 has been seated. According to an embodiment, the processor 120 of the wearable device 101 may identify whether the wearable device 101 has been seated in a charging device (e.g., the charging device 501 in FIG. 4) by using a sensor (e.g., the sensor module 176 in FIG. 1). According to an embodiment, the wearable device 101 may establish a communication connection with the charging device 501 by using a communication module (e.g., the communication module 190 FIG. 1). According to an embodiment, the processor 120 may receive, from the charging device 501, information about whether the wearable device 101 has been seated in the charging device 501.

The processor 120 may transmit folding direction information to the charging device 501 based on the wearable device 101 being identified to have been seated in the charging device 501. According to an embodiment, the processor 120 may identify the folding direction again or may identify whether the charging device 501 has been seated again or may remain in a standby state based on the wearable device 101 being identified to have not been seated in the charging device 501.

According to an embodiment, the processor 120 of the wearable device 101 may transmit the folding order information. According to an embodiment, the processor 120 may transmit the folding order information to the charging device 501.

Figure 2:
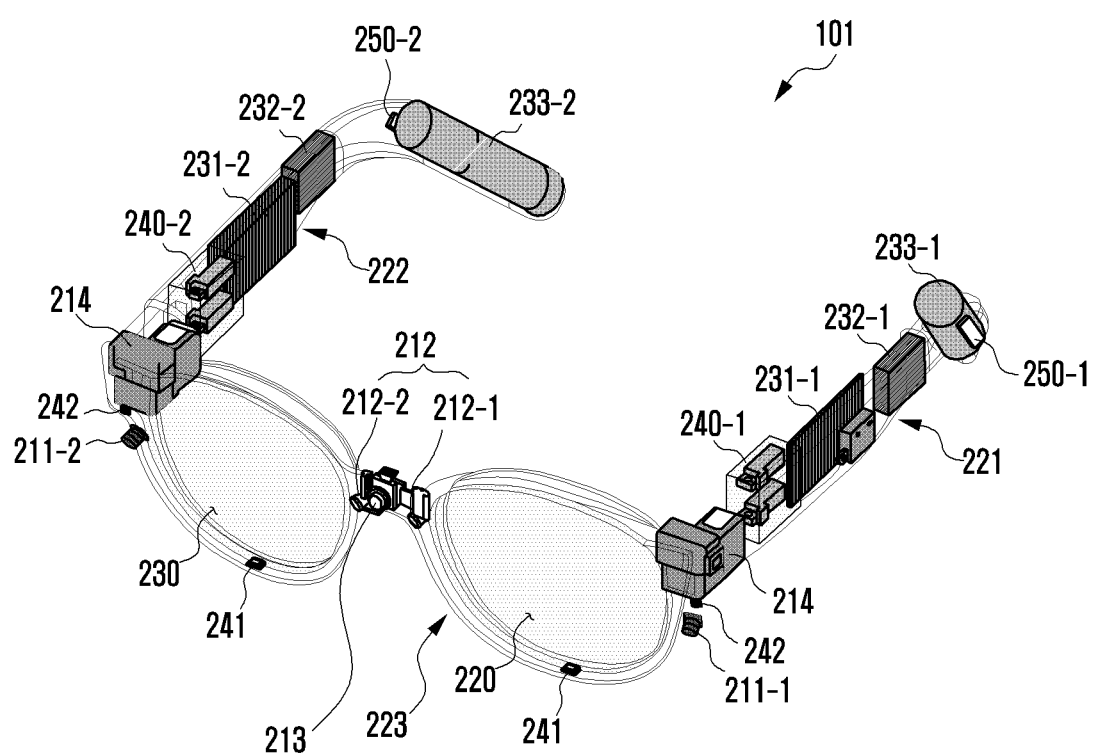
FIG. 2 is a perspective view of the wearable device according to an embodiment.

FIG. 2 is a perspective view of the electronic device 101 according to an embodiment.

With reference to FIG. 2, the electronic device 101 according to an embodiment may include a display module 214 (e.g., the display module 160 in FIG. 1), a camera module (e.g., the camera module 180 in FIG. 1), an audio module (e.g., the audio module 170 in FIG. 1), the first leg member 221 and/or the second leg member 222. According to an embodiment, the display module 160 may include a first display (e.g., the first display module 351 in the first glass 220) and/or a second display (e.g., the second display module 353 in the second glass 230). According to an embodiment, at least one camera may include the camera 213 for photographing, which is used to photograph images corresponding to the field of view (FoV) of the user and/or measure distance from an object, the eye tracking camera 212 for identifying the direction of a user gaze and/or the camera 211-1 and 211-2 for recognition (the gesture camera), which are used to recognize objects in a given space. For example, the camera 213 for photographing may photograph the front direction of the electronic device 101, and the eye tracking camera 212 may photograph the direction opposite to the photographing direction of the camera 213. For example, the eye tracking camera 212 may at least partially photograph both eyes of a user. According to an embodiment, the first leg member 221 and/or the second leg member 222 may include printed circuit boards (PCBs) 231-1 and 231-2, the speakers 232-1 and 232-2 and/or batteries 233-1 and 233-2.

According to an embodiment, the display module 160 (e.g., the display module 214 in FIG. 2) may be disposed in the main body part (e.g., the main body part 223 in FIG. 2) of the electronic device 101, and may include a condensing lens (not illustrated) and/or a transparent waveguide (not illustrated) in a glass (e.g., the first glass 220 and the second glass 230). For example, the transparent waveguide may be at least partially disposed in a part of the glass. According to an embodiment, light emitted from the display module 160 may be incident on one end of the first glass 220 and the second glass 230. The incident light may be delivered to the user through the waveguide formed within the glass. The waveguide may be manufactured using glass, plastic, or polymer, and may include a nano pattern formed on one internal or external surface thereof, for example, a grating structure having polygonal or curved shape. According to an embodiment, the incident light may be propagated and reflected within the waveguide by the nano pattern and then provided to the user. According to an embodiment, the waveguide may include at least one diffraction element (e.g., diffractive optical element (DOE), holographic optical element HOE)) and/or a reflection element (e.g., reflection mirror). According to an embodiment, the waveguide may guide, into the eyes of the user, light emitted from a light source by using at least one diffraction element or reflection element.

With reference to FIG. 2, the first leg member 221 and/or the second leg member 222 may include the PCB 231-1 and 231-2 for delivering electrical signals to each of the components of the electronic device 101, the speaker 232-1 and 232-2 for outputting audio signals, and hinge parts 240-1 and 240-2 configured to house at least part of the battery 233-1 and 233-2, where the hinge parts 240-1 and 240-2 are coupled to the main body part 223 of the electronic device 101. According to an embodiment, the speaker 232-1 and 232-2 may include the first speaker 232-1 for delivering audio signals to the left ear of the user and the second speaker 232-2 for delivering audio signals to the right ear of the user. The speaker 232-1 and 232-2 may be included in the audio module 170 in FIG. 1. According to an embodiment, the electronic device 101 may include the plurality of batteries 233-1 and 233-2, and may supply power to the PCB 231-1 and 231-2 through a power management module (e.g., the power management module 188 in FIG. 1).

With reference to FIG. 2, the electronic device 101 may include the microphone 241 for detecting voice of the user and surrounding sound. For example, the microphone 241 may be included in the audio module 170 in FIG. 1. The electronic device 101 may include at least one illumination LED 242 for increasing the accuracy of at least one camera (e.g., the camera 213 for photographing, the eye tracking camera 212 and/or the camera 211-1 and 211-2 for recognition). For example, the illumination LED 242 may be used as auxiliary means for increasing the accuracy of the eye tracking camera 212 when the pupil of the user is photographed by the eye tracking camera 212. An IR LED having infrared wavelength instead of visible wavelength may be used as the illumination LED 242. Furthermore, for example, the illumination LED 242 may be used as auxiliary means in a dark environment or if the subject to be photographed is not easily detected due to the mixing of several light sources and the reflection of light when the gesture of the user is to be photographed by the camera 211-1 and 211-2 for recognition.

With reference to FIG. 2, the electronic device 101 according to an embodiment may include the main body part 223 and leg members (e.g., the first leg member 221 and/or the second leg member 222). The main body part 223 and the leg member 221 and 222 may be operatively connected. For example, the main body part 223 and the leg member 221 and 222 may be operatively connected through the hinge part 240-1 and 240-2. The main body part 223 may be at least partially held on the nose of a user, and may include the display module 160 and a camera module (e.g., the camera module 180 in FIG. 1). The leg member 221 and 222 may be support members disposed on the ears of the user, and may include the first leg member 221 disposed on the left ear of the user and/or the second leg member 222 disposed on the right ear thereof. According to an embodiment, the first leg member 221 or the second leg member 222 may at least partially include the PCB 231-1 and 231-2, the speaker 232-1 and 232-2, the battery 233-1 and 233-2 (e.g., the battery 189, the first battery 333 and/or the second battery 334 in FIG. 1) and/or the antenna 250-1 and 250-2 (e.g., the charging antenna module 340, the first antenna 341 and/or the second antenna 342 in FIG. 1). The battery and/or the antenna may be electrically connected to a power management module (e.g., the power management module 188 in FIG. 1).

According to an embodiment, the display module 160 may include the first glass 220 and/or the second glass 230, and may provide visual information to the user through the first glass 220 and the second glass 230. The electronic device 101 may include the first glass 220 corresponding to the left eye of the user and/or the second glass 230 corresponding to the right eye thereof. According to an embodiment, the display module 160 may include a display panel and/or a lens (e.g., glass). For example, the display panel may include a transparent material, such as glass or plastic.

According to an embodiment, the display module 160 may include transparent element. The user may his or her surroundings through the display module 160. The display module 160 may display a virtual object in at least some area of the transparent element so that the virtual object is seen as being added to at least a part of the actual space by the user. The first glass 220 and/or the second glass 230 included in the display module 160 may include a plurality of display panels corresponding to both eyes (e.g., left eye and/or right eye) of the user, respectively.

According to an embodiment, the electronic device 101 may be a virtual reality (VR) device. If the electronic device 101 is a VR device, the first glass 220 may be the first display module 351, and the second glass 230 may be the second display module 353.

According to an embodiment, a virtual object outputted through the display module 160 may include information related to an application program executed in the electronic device 101 and/or information related to an external object disposed in an actual space corresponding to an area determined as the field of view (FoV) of the user. For example, the electronic device 101 may identify an external object, which corresponds to and is included in at least some of the area determined as the FoV of the user, in the image information related to the actual space obtained through a camera (e.g., the camera 213 for photographing) of the electronic device 101. The electronic device 101 may output (or display) a virtual object, related to the external object identified in the at least some of the area, through an area that belongs to a display area of the electronic device 101 and that is determined as the FoV of the user. The external object may be an object present in the actual space. According to an embodiment, the display area in which the electronic device 101 displays the virtual object may include a part (e.g., at least a part of the display panel) of the display module (e.g., the first display module 351 or the second display module 353). According to an embodiment, the display area may be an area corresponding to at least a part of the first glass 220 and/or the second glass 230.

According to an embodiment, the electronic device 101 may include the camera 213 for photographing (e.g., an RGB camera), which is used to photograph images corresponding to the FoV of the user and/or measure distance from an object, the eye tracking camera 212 for identifying the gaze direction of the user and/or the camera 211-1 and 211-2 for recognition (e.g., the gesture camera), which is used to recognize a given space. According to an embodiment, the electronic device 101 may measure the distance from an object disposed in the front direction of the electronic device 101 by using the camera 213 for photographing. According to an embodiment, a plurality of the eye tracking cameras 212 may be disposed in the electronic device 101 for both eyes of a user. For example, the eye tracking camera 212 may photograph a direction opposite to the photographing direction of the camera 213 for photographing. The eye tracking camera 212 may detect a gaze direction (e.g., pupil movement) of the user. For example, the eye tracking camera 212 may include the first eye tracking camera 212-1 for tracking the gaze direction of the left eye of the user and the second eye tracking camera 212-2 for tracking the gaze direction of the right eye of the user. According to an embodiment, the electronic device 101 may detect a user gesture within a preset distance (e.g., a given space) by using the cameras 211-1 and 211-2 for recognition. For example, the cameras 211-1 and 211-2 for recognition may be configured in as a plural number of cameras, and may be disposed on both sides of the electronic device 101. The electronic device 101 may detect an eye of the user corresponding to primary sightedness and/or auxiliary sightedness, by using at least one camera. For example, the electronic device 101 may detect an eye of the user corresponding to primary sightedness and/or auxiliary sightedness based on the gaze direction of the user for an external object or a virtual object.

According to an embodiment, the camera 213 for photographing may include a camera having high resolution, such as a high resolution (HR) camera and/or a photo video (PV) camera. According to an embodiment, the eye tracking camera 212 may track the gaze direction of the user by detecting the pupil of the user, and may be used to cause the center of a virtual image to be moved in accordance with the gaze direction. For example, the eye tracking camera 212 may be divided into the first eye tracking camera 212-1 corresponding to the left eye of the user and the second eye tracking camera 212-2 corresponding to the right eye of the user. Performance and/or standards of the first and second eye tracking cameras may be substantially the same. According to an embodiment, the camera 211-1 and 211-2 for recognition may be used to detect a hand (or gesture) of the user and/or recognize the space surrounding the user, and may include a global shutter (GS) camera. For example, the camera 211-1 and 211-2 for recognition may include a camera having less motion blur, such as a rolling shutter (RS) camera, in order to detect and track fast hand gesture and/or fine movement of a finger of the user.

According to an embodiment, the electronic device 101 may also display a virtual object related to an AR service based on image information related to the actual space surrounding the user, which is obtained through a camera (e.g., the camera module 180 in FIG. 1) of the electronic device 101. According to an embodiment, the electronic device 101 may display a virtual object using a display module (e.g., the first display module 351 corresponding to the left eye of the user and/or the second display module 353 corresponding to the right eye of the user). According to an embodiment, the electronic device 101 may display a virtual object based on preset configuration information (e.g., resolution, frame rate, brightness and/or display area).

According to an embodiment, the electronic device 101 may operate the first display panel included in the first glass 220 and the second display panel included in the second glass 230 as independent displays. For example, the electronic device 101 may identify display performance of the first display panel based on first configuration information, and may identify display performance of the second display panel based on second configuration information.

The number and location of at least one camera (e.g., the camera 213 for photographing, the eye tracking camera 212 and/or the camera 211-1 and 211-2 for recognition) included in the electronic device 101 illustrated in FIG. 2 may not be limited. For example, the number and location of at least one camera (e.g., the camera 213 for photographing, the eye tracking camera 212 and/or the camera 211-1 and 211-2 for recognition) may be various based on the shape (e.g., form or size) of the electronic device 101.

Figure 3:
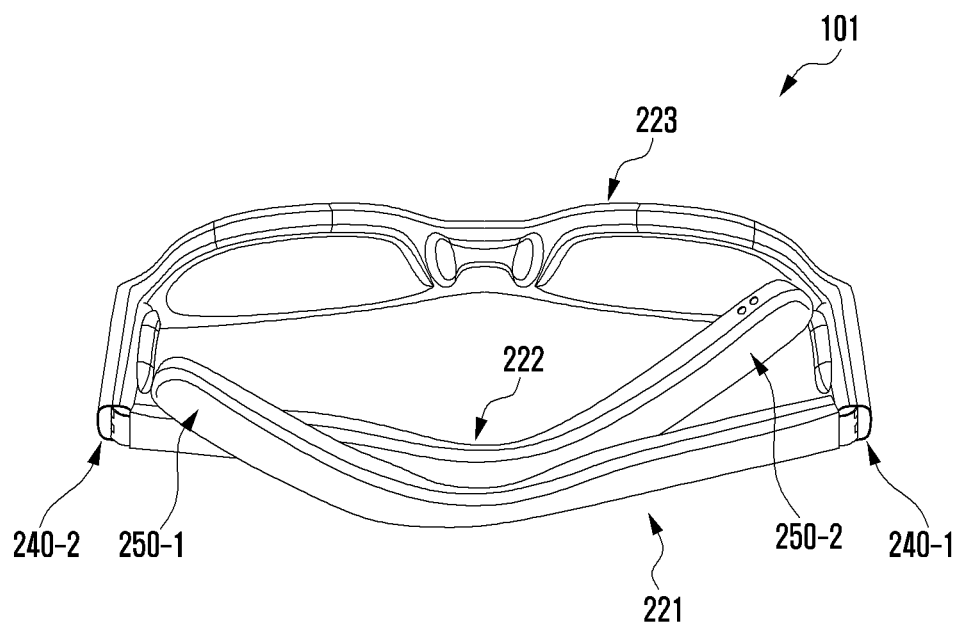
FIG. 3 illustrates one or more locations where the antennas of the wearable device are mounted according to an embodiment.

FIG. 3 illustrates one or more locations where the antenna of the wearable device 101 according to an embodiment are mounted.

FIG. 3 may illustrate the state in which leg members (e.g., the first leg member 221 and the second leg member 222) of the wearable device 101 have been folded. According to an embodiment, leg members (e.g., the first leg member 221 and the second leg member 222) may be rotatably connected to the main body part 223 through the hinge parts 240-1 and 240-2. According to an embodiment, leg members (e.g., the first leg member 221 and the second leg member 222) may be rotated and folded.

According to an embodiment, the wearable device 101 may include a first reception antenna 250-1 (e.g., the first antenna 341 in FIG. 1, the first reception antenna 250-1 in FIG. 2) and/or a second reception antenna 250-2 (e.g., the second antenna 342 in FIG. 1, the second reception antenna 250-2 in FIG. 2). According to certain embodiments, the first reception antenna 250-1 and/or the second reception antenna 250-2 may be disposed in the main body part 223 and/or a leg member (e.g., the first leg member 221 and/or the second leg member 222). According to an embodiment, the first reception antenna 250-1 may be disposed in the first leg member 221. According to an embodiment, the second reception antenna 250-2 may be disposed in the second leg member 222. According to an embodiment, each of antennas (e.g., the first reception antenna 250-1 and the second reception antenna 250-2) may be disposed to not overlap another component of the wearable device 101. According to an embodiment, the first reception antenna 250-1 may be disposed in at least some area of the first leg member 221, which does not overlap the second leg member 222, when the leg members (e.g., the first leg member 221 and the second leg member 222) have been folded. According to an embodiment, the second reception antenna 250-2 may be disposed in at least some area of the second leg member 222, which does not overlap the first leg member 221 when the leg members (e.g., the first leg member 221 and the second leg member 222) have been folded. According to an embodiment, the first reception antenna 250-1 may be disposed in at least some area of the first leg member 221 (e.g., an end area of the first leg member 221), which does not overlap the second reception antenna 250-2 when the leg members (e.g., the first leg member 221 and the second leg member 222) have been folded. According to an embodiment, the second reception antenna 250-2 may be disposed in at least some area of the second leg member 222 (e.g., an end area of the second leg member 222), which does not overlap the first reception antenna 250-1, when the leg members (e.g., the first leg member 221 and the second leg member 222) have been folded. According to an embodiment, the first reception antenna 250-1 and/or the second reception antenna 250-2 may be disposed to be directed toward a direction opposite to the direction toward the main body part 223 in when the leg members (e.g., the first leg member 221 and the second leg member 222) have been folded.

FIG. 4 is a block diagram of a charging device according to an embodiment.

With reference to FIG. 4, the charging device 501 may include a processor 580, an output module 512, a sensor module 520, a connection terminal 530, a power management module 540, a battery 550, a communication module 510, a charging control module 560 and/or an antenna module 570. According to an embodiment, the charging device 501 may be connected to an external electronic device (not illustrated) through the connection terminal 530 (e.g., USB TYPE-C). For example, the power management module 540 of the charging device 501 may receive power from the external electronic device through the connection terminal 530, and may charge the battery 550. Furthermore, for example, the processor 580 of the charging device 501 may perform power line communication with the external electronic device through the connection terminal 530. Furthermore, for example, the power management module 540 of the charging device 501 may wirelessly receive power from the external electronic device through the antenna module 570 and charge the battery 550 or may transmit power of the battery 550 to the outside of the device through the antenna module 570.

According to an embodiment, the processor 580 may control at least a component (e.g., hardware or software component), and may perform various data processing and operations. According to an embodiment, the processor 580 may control charging of an external electronic device (e.g., the wearable device 101 in FIG. 2). The processor 580 may transmit power to the external electronic device by controlling the charging control module 560.

The output module 512 may output visual signal and/or audio signal to the outside of the device based on control of the processor 580. According to an embodiment, the output module 512 may include a light source, such as a light emitting diode (LED). According to an embodiment, the output module 512 may include a speaker.

The sensor module 520 may detect an operating state (e.g., power or temperature) of the charging device 501 or an external environment state (e.g., user state), and may generate an electrical signal or data value corresponding to the detected state. According to an embodiment, the sensor module 520 of the charging device 501 may include a pressure sensor, a proximity sensor, an illuminance sensor and/or a magnetic sensor (e.g., a Hall sensor). According to an embodiment, the pressure sensor may detect an object (e.g., the wearable device 101 in FIG. 2) coming into contact with at least some area (e.g., the support part 650 in FIG. 5) of the charging device 501. According to an embodiment, the proximity sensor may detect that an object (e.g., the wearable device 101 in FIG. 2) is adjacent to the charging device 501. The illuminance sensor may measure brightness within (e.g., first space 613 in FIG. 5) the charging device 501. According to an embodiment, the processor 580 may determine the brightness within the charging device 501 by using the illuminance sensor, and may detect whether an external electronic device (e.g., the wearable device 101 in FIG. 1) has been seated in the charging device 501 and/or whether the charging device 501 has been opened or closed based on the degree of brightness. For example, when internal brightness is dark, the processor 580 may identify that the charging device 501 is closed. Furthermore, for example, when internal brightness is bright, the processor 580 may identify that the charging device 501 is opened. Furthermore, for example, when a change in internal brightness is detected when the charging device 501 is opened, the processor 580 may identify that an external electronic device (e.g., the wearable device 101 in FIG. 2) has been seated in or detached from the charging device 501. According to an embodiment, the processor 580 may detect a change in the magnetic field within the charging device 501 by using the magnetic sensor, and identify whether an external electronic device (e.g., the wearable device 101 in FIG. 2) has been seated in the charging device 501 based on the detected change. According to an embodiment, the sensor module 520 may identify a folding order of an external electronic device (e.g., the wearable device 101 in FIG. 2) seated in the charging device 501. A sensor (e.g., magnetic field sensor or proximity sensor) included in the sensor module 520 may determine which leg member of the wearable device 101 seated in the charging device 501 is closer (e.g., the first leg member 221 and/or the second leg member 222 in FIG. 2), and may detect the folding order. According to an embodiment, the sensor module 520 may identify whether the charging device 501 has been opened or closed. For example, the processor 580 may detect a change in the magnetic field within the charging device 501 by using the magnetic sensor (e.g., a Hall sensor), and may identify whether the charging device 501 has been opened or closed based on the detected change. According to an embodiment, the charging device 501 may include a main body portion (e.g., first housing 611 in FIG. 5) and a cover portion (e.g., second housing 612 in FIG. 5). If the magnetic sensor is disposed in at least one of the main body portion and the cover portion and a magnetic substance, such as a magnet, is disposed in the other of the main body portion and the cover portion, the magnetic sensor may detect different magnetic forces depending on whether the charging device 501 has been opened or closed.

The battery 550 may supply power to at least one component of the charging device 501. According to an embodiment, the battery 550 may include a primary cell which cannot be recharged, a rechargeable secondary cell or a fuel cell, for example. According to an embodiment, the battery 550 may be charged by being supplied with power or may be discharged by providing power under the control of the power management module 540.

According to an embodiment, the power management module 540 may manage power supplied to the charging device 501. The power management module 540 may include the charging control module 560. The power management module 540 may be directly connected to the processor 580, and may supply power thereto. The power management module 540 may receive power from an external electronic device through the connection terminal 530 (e.g., TYPE-C) and charge the battery 550 or may supply power to other components of the charging device 501. According to an embodiment, the charging device 501 may receive power from the external electronic device through wireless charging, and may charge the battery 550. According to an embodiment, the charging device 501 may wirelessly receive external power from the antenna module 570. According to an embodiment, the power management module 540 may be electrically connected to components (e.g., the output module 512, the sensor module 520 and/or the communication module 510) of the charging device 501. For example, the power management module 540 may provide power of the battery 550 to components of the charging device 501 based on control of the processor 580. According to an embodiment, the charging device 501 may receive power from the battery 550 through the power management module 540.

According to an embodiment, the charging control module 560 may manage power outputted from the charging device 501 to the outside of the device. The charging control module 560 may include at least one of a first charging module 561 and a second charging module 562. The charging module 560 may implement at least part of the power management module 540. According to an embodiment, the charging control module 560 may output power of the battery 550 to the outside (e.g., the wearable device 101 in FIG. 2) under the control of the processor 580. According to an embodiment, the charging control module 560 may radiate magnetic field according to electromagnetic induction to the outside by supplying power to the antenna module 570. According to an embodiment, the charging control module 560 may control power transmitted to an external electronic device (e.g., the wearable device 101 in FIG. 2).

The antenna module 570 may transmit signal or power to the outside of the charging device 501 (e.g., the wearable device 101 in FIG. 1) or may receive signal or power from the outside (e.g., external electronic device). According to an embodiment, the antenna module 570 may include an antenna including a radiator composed of a conductor or a conductive pattern formed on a substrate (e.g., a PCB). According to an embodiment, the antenna module 570 may include a plurality of antennas (e.g., first transmission antenna 661, second transmission antenna 662 and/or third antenna 640). Signal or power may be transmitted or received between the charging device 501 and an external electronic device through one or more of the first to third antennas. The antenna module 570 may receive power from the outside of the charging device 501. According to an embodiment, the antenna module 570 may include a loop type antenna and/or a coil type antenna. According to an embodiment, the antenna module 570 may include a plurality of antennas (e.g., the first antenna 571, the second antenna 572 and/or the third antenna 573). The plurality of antennas (e.g., the first antenna 571, the second antenna 572) may wirelessly transmit power to an external electronic device (e.g., the wearable device 101 in FIG. 2). For example, the first antenna 571 and/or the second antenna 572 may receive current from the battery 550 under the control of the processor 580 and/or the charging control module 560, and may radiate magnetic field derived due to the supplied current. According to an embodiment, the third antenna 573 may be in a magnetic field and/or an electromagnetic field generated by another device, and may deliver, to the power management module 540 and/or the battery 550, current generated through magnetic induction and/or magnetic resonance attributable to the external magnetic field and/or electromagnetic field.

According to certain embodiments, the processor 580 may process an operation or data about control and/or communication of each of the components of the charging device 501. The processor 580 may be connected to components of the charging device 501, such as the communication module 510, the sensor module 520 and the antenna module 570, operatively, electrically and/or functionally. Each of operations of the processor 580 according to certain embodiments may be performed in real time. The type and/or amount of operations, calculation, and data processing which may be performed by the processor 580 will not be limited. However, in this document, only the configuration and function of the processor 580 for controlling the charging of an external electronic device (e.g., the wearable device 101 in FIG. 1) according to certain embodiments is described.

According to an embodiment, the processor 580 of the charging device 501 may identify whether a wearable device (e.g., the wearable device 101 in FIG. 1) has been seated in the charging device 501. According to an embodiment, the charging device 501 may include a sensor (e.g., the sensor module 520). According to an embodiment, the processor 580 may identify whether the wearable device 101 has been seated in the charging device 501 by using the sensor module 520. The sensor module 520 may include a pressure sensor, a proximity sensor, an illuminance sensor and/or a magnetic sensor, for example. According to an embodiment, the pressure sensor may detect an object (e.g., the wearable device 101 in FIG. 1) coming into contact with at least some area (e.g., the support part 650 in FIG. 5) of the charging device 501. According to an embodiment, the proximity sensor may detect that an object (e.g., the wearable device 101 in FIG. 1) is adjacent to the charging device 501. The illuminance sensor may measure brightness within (e.g., the first space 613 in FIG. 5) the charging device 501. According to an embodiment, the processor 580 may determine the brightness within the charging device 501 by using the illuminance sensor, and may detect whether an external electronic device (e.g., the wearable device 101 in FIG. 1) has been seated in the charging device 501 and/or whether the charging device 501 has been opened or closed based on the degree of brightness. For example, when internal brightness is dark, the processor 580 may identify that the charging device 501 is closed. Furthermore, for example, when internal brightness is bright, the processor 580 may identify that the charging device 501 is opened. Furthermore, for example, when a change in internal brightness is detected when the charging device 501 is opened, the processor 580 may identify that an external electronic device (e.g., the wearable device 101 in FIG. 2) has been seated in or detached from the charging device 501. According to an embodiment, the processor 580 may detect a change in the magnetic field within the charging device 501 by using the magnetic sensor, and may identify whether an external electronic device (e.g., the wearable device 101 in FIG. 1) has been seated. According to an embodiment, the processor 580 of the charging device 501 may identify whether the wearable device 101 has been seated in the charging device 501 from the wearable device 101. The processor 580 of the charging device 501 may establish a communication connection with the wearable device 101 by using a communication module (e.g., the communication module 510 in FIG. 4). According to an embodiment, the processor 580 may receive, from the wearable device 101, information about whether the wearable device 101 has been seated in the charging device 501 by controlling the communication module 510, and may identify whether the wearable device 101 has been seated in the charging device 501. According to an embodiment, the processor 580 may identify whether the charging device 501 has been opened or closed by using the sensor module 520. For example, the processor 580 may detect a change in the magnetic field within the charging device 501 by using the magnetic sensor (e.g., a Hall sensor), and may identify whether the charging device 501 has been opened or closed based on the detected change. According to an embodiment, the charging device 501 may include a main body portion (e.g., the first housing 611 in FIG. 5) and a cover portion (e.g., the second housing 612 in FIG. 5). If the magnetic sensor is disposed in at least one of the main body portion and the cover portion and a magnetic substance, such as a magnet, is disposed in the other thereof, the processor 580 may detect different magnetic forces depending on whether the charging device 501 has been opened or closed by using the magnetic sensor.

According to an embodiment, the processor 580 of the charging device 501 may identify a folding order of the leg members of the wearable device 101. According to an embodiment, the processor 580 may determine which leg member of the wearable device 101 seated in the charging device 50 is closer (e.g., the first leg member 221 and/or the second leg member 222 in FIG. 2), by using a sensor (e.g., a magnetic field sensor or a proximity sensor) included in the sensor module 520, and may detect the folding order. According to an embodiment, the processor 580 may receive folding order information from the wearable device 101 by using the communication module 510, and may identify the folding order.

According to an embodiment, the processor 580 of the charging device 501 may control charging. According to an embodiment, the processor 580 may control charging based on the folding order. According to an embodiment, the processor 580 may move at least some (e.g., support part 650 in FIG. 5) of the components of the charging device 501 by driving a driving part, such as a motor. According to an embodiment, the processor 580 may control charging by moving the support part 650 based on the folding order. The processor 580 may rotate and move or tilt and move the support part 650. For example, when the wearable device 101 is folded in the folding order of the second leg member 222 and then the first leg member 221, i.e. the second leg member 222 is closer to the main body part 223, the processor 580 may counterclockwise rotate and move the support part 650. Furthermore, for example, when the wearable device 101 is folded in the folding order of the second leg member 222 and then the first leg member 221, i.e. the second leg member 222 is closer to the main body part 223, the processor 580 may tilt and move the support part 650 so that a second transmission antenna 662 is moved upward (e.g., the +z axis direction in FIG. 7) and a first transmission antenna 661 moved is downward (e.g., the −z axis direction in FIG. 7). The support part 650 is rotated and moved and/or tilted and moved, so that the distance between the first transmission antenna 661 and the first reception antenna 250-1 and the distance between the second transmission antenna 662 and the second reception antenna 250-2 can be substantially identically maintained. Furthermore, for example, when the wearable device 101 is folded in the folding order of the first leg member 221 and then the second leg member 222, i.e. the first leg member 221 is closer to the main body part 223, the processor 580 may clockwise rotate and move the support part 650. Furthermore, for example, when the wearable device 101 is folded in the folding order of the first leg member 221 and then the second leg member 222, i.e. the first leg member 221 is closer to the main body part 223, the processor 580 may tilt and move the support part 650 so that the first transmission antenna 661 is moved upward (e.g., the +z axis direction in FIG. 7) and the second transmission antenna 662 is moved downward (e.g., the −z axis direction in FIG. 7). The support part 650 is rotated and moved and/or tilted and moved, so that the distance between the first transmission antenna 661 and the first reception antenna 250-1 and the distance between the second transmission antenna 662 and the second reception antenna 250-2 can be substantially identically maintained.

According to an embodiment, the processor 580 may control transmission intensity of at least one antenna (e.g., the first antenna 571 and/or the second antenna 572 in FIG. 4) that wirelessly transmits power. According to an embodiment, the distance between a reception antenna (e.g., the first antenna 341 and/or the second antenna 342 in FIG. 1) included in the wearable device 101 and a transmission antenna (e.g., the first antenna 571 and/or the second antenna 572 in FIG. 4) included in the charging device 501 may be different depending on the folding order of the leg members of the wearable device 101. Accordingly, the processor 580 may control transmission intensity of at least one antenna based on the folding order so that the transmission intensity is increased with respect to an antenna having a long distance and is decreased between near antennas by considering a distance difference. According to an embodiment, the processor 580 may increase the intensity of the magnetic field radiated by the transmission antenna (e.g., the first antenna 571 and/or the second antenna 572 in FIG. 4) that is disposed relatively far from one of reception antennas (e.g., the first antenna 341 and/or the second antenna 342 in FIG. 1) of the wearable device 101, based on the folding order.

According to an embodiment, the processor 580 may receive, from the wearable device 101, information on the charging level of at least one battery (e.g., the first battery 333 and/or the second battery 334 in FIG. 1) included in the wearable device 101, and may control charging based on the battery charging level.

According to an embodiment, the processor 580 may control the wearable device 101 to be charged using only one of transmission antennas (e.g., the first antenna 571 and the second antenna 572 in FIG. 4) of the charging device 501. For example, charging may be performed using only a transmission antenna that is nearer to the corresponding reception antenna, and the total charging speed of the wearable device 101 may be controlled by further increasing radiation intensity (e.g., the intensity of current flowing into an antenna).

Figure 5:
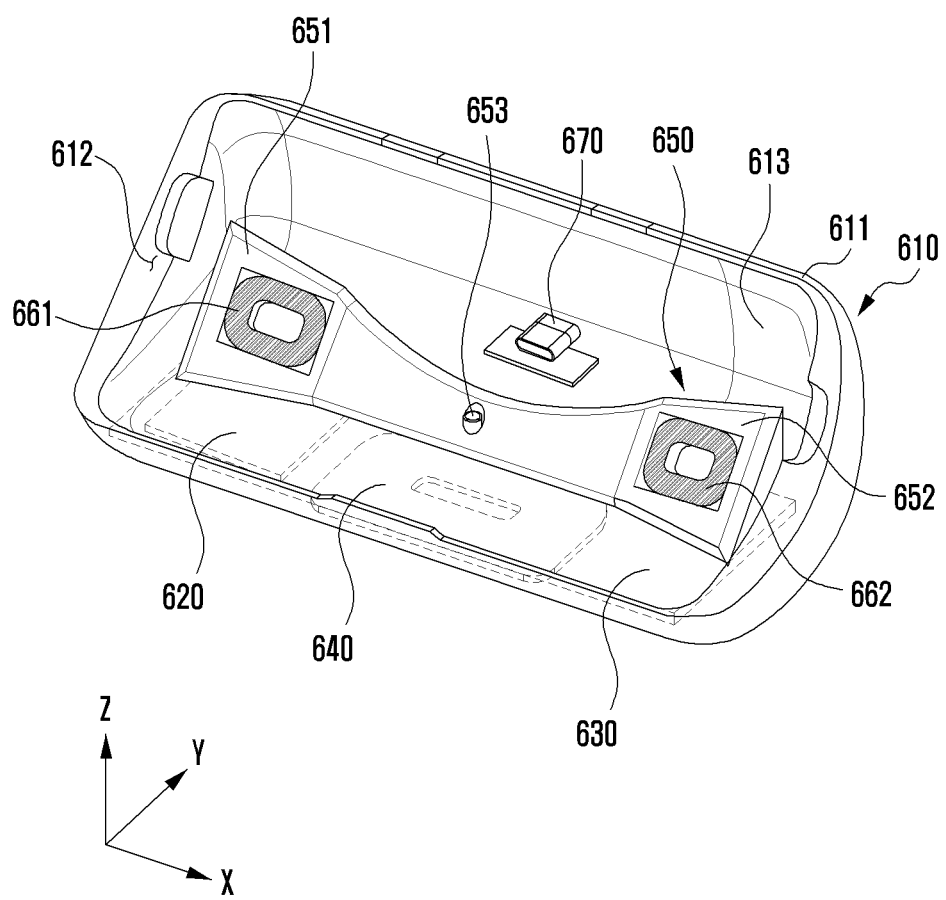
FIG. 5 is a perspective view of the charging device according to an embodiment.

FIG. 5 is a perspective view of the charging device 501 according to an embodiment.

Figure 6:
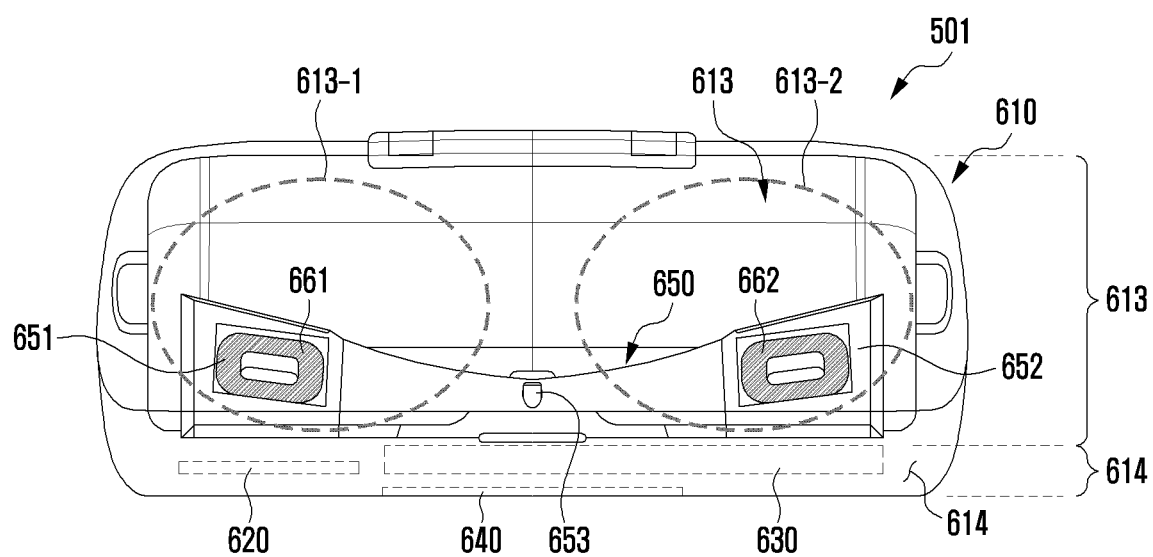
FIG. 6 is a front view of the charging device according to an embodiment.

FIG. 6 is a front view of the charging device 501 according to an embodiment.

With reference to FIGS. 5 and 6, the charging device 501 may include a housing 610, a PCB 620, a battery 630, the support part 650, the first transmission antenna 661, the second transmission antenna 662, a third antenna 640 and/or a connection terminal 670. The outside of the charging device 501 may be implemented by the housing 610. According to an embodiment, various components included in the charging device 501 may be disposed in the housing 610.

With reference to FIGS. 5 and 6, the housing 610 may include the first housing 611 and/or the second housing 612. According to an embodiment, the second housing 612 may form a cover, and may be operatively connected to the first housing 611. According to an embodiment, the second housing 612 may be connected to the first housing 611 through at least one hinge, and may rotate to open and close the charging device 501. The charging device 501 may identify whether the charging device 501 has been opened or closed, whether an external electronic device (e.g., the wearable device 101 in FIG. 2) has been seated in the charging device 501 and/or the folding order of the leg members of the wearable device 101. For example, the charging device 501 may identify information about whether data has been received from an external electronic device (e.g., the wearable device 101 in FIG. 2) to determine whether the charging device 501 is open or closed, whether an external electronic device (e.g., the wearable device 101 in FIG. 2) has been seated in the charging device 501 and/or the folding order of the leg members of the wearable device 101 by using a sensor (e.g., the sensor module 520 in FIG. 4) included in the charging device 501. The housing 610 may include the first space 613 in which an external electronic device (e.g., the wearable device 101 in FIG. 2) may be seated. The first space 613 may be an internal space formed by the first housing 611 and the second housing 612. For example, the first space 613 may be a space surrounded by the first housing 611 and the second housing 612 as the first housing 611 and the second housing 612 are coupled together. According to an embodiment, components of the charging device 501 may be disposed in the first space 613. According to an embodiment, the housing 610 (e.g., the first housing 611 and the second housing 612) may include a second space 614. The second space 614 may be a space formed within the first housing 611. According to an embodiment, components of the charging device 501 may be disposed in the second space 614.

With reference to FIGS. 5 and 6, the support part 650, the first transmission antenna 661 and/or the second transmission antenna 662 may be disposed in the first space 613. The support part 650 may be disposed in the first space 613, and may be connected to the housing 610 through a connection part 653. The connection part 653 may connect the support part 650 to the housing 610 so that the support part 650 may move within the first space 613. For example, the support part 650 may be disposed to be rotated and moved, tilted and moved and/or moved up and down. Furthermore, for example, the connection part 653 may include at least one of a rotation axis, a tilt axis and an elastic member. The support part 650 may support an external electronic device (e.g., the wearable device 101 in FIG. 2) when the external electronic device (e.g., the wearable device 101 in FIG. 2) is seated in the charging device 501. According to an embodiment, the support part 650 may be moved by the seating of an external electronic device (e.g., the wearable device 101 in FIG. 2). For example, the support part 650 may come into contact with the seated wearable device 101, and may be moved by the weight of the wearable device 101. Furthermore, for example, the support part 650 may be moved when a driving part (not illustrated) controlled by a processor (e.g., the processor 580 in FIG. 4) is supplied with power. The first transmission antenna 661 and/or the second transmission antenna 662 may be disposed in at least some area of the support part 650 disposed in the first space 613. The first space 613 may include a first area 613-1 and a second area 613-2. According to an embodiment, the support part 650 may include a first holding part 651 disposed at a location corresponding to the first area 613-1. According to an embodiment, the support part 650 may include a second holding part 652 disposed in the second area 613-2. According to an embodiment, the first transmission antenna 661 may be disposed at a location corresponding to the first area 613-1. For example, the first transmission antenna 661 may be disposed in the first holding part 651. According to an embodiment, the second transmission antenna 662 may be disposed at a location corresponding to the second area 613-2. For example, the second transmission antenna 662 may be disposed in the second holding part 652. According to an embodiment, a plurality of antennas (e.g., the first transmission antenna 661 and/or the second transmission antenna 662) may be connected to the PCB 620 and/or the battery 630, and may wirelessly deliver power to an external electronic device (e.g., the wearable device 101 in FIG. 2). For example, the first transmission antenna 661 and/or the second transmission antenna 662 may receive power from the battery 630, and may radiate magnetic field attributable to electromagnetic induction. Furthermore, for example, the first transmission antenna 661 may radiate a magnetic field in the direction toward the first area 613-1. Furthermore, for example, the second transmission antenna 662 may radiate magnetic field in the direction toward the second area 613-2.

With reference to FIGS. 5 and 6, the PCB 620, the battery 630 and/or the third antenna 640 may be disposed in the second space 614. The PCB 620 may deliver electrical signals to each of the components of the charging device 501. The PCB 620 may be electrically connected to components of the charging device 501, such as the battery 630, the connection terminal 670 and/or an antenna (e.g., the first transmission antenna 661, the second transmission antenna 662 and/or the third antenna 640), and may deliver electrical signals between the components. The charging device 501 may be connected to an external electronic device (not illustrated) through the connection terminal 670 (e.g., the connection terminal 530 in FIG. 4) (e.g., USB TYPE-C). The battery 630 (e.g., the battery 550 in FIG. 4) may be disposed in the second space 614, and may supply power to or receive power from each of the components of the charging device 501. The third antenna 640 may be disposed in the second space 614, and may wirelessly receive power from the outside (e.g., an external electronic device). For example, the third antenna 640 may generate an induced current from an external magnetic field, and may deliver the generated current to a power management module (e.g., the power management module 540 in FIG. 4) and/or the battery 630. The third antenna 640 may be disposed to receive magnetic field radiated in the direction (e.g., the Z axis direction) toward the inside (e.g., the first space 613) of the housing 610 from the outside of the housing 610.

Figure 7:
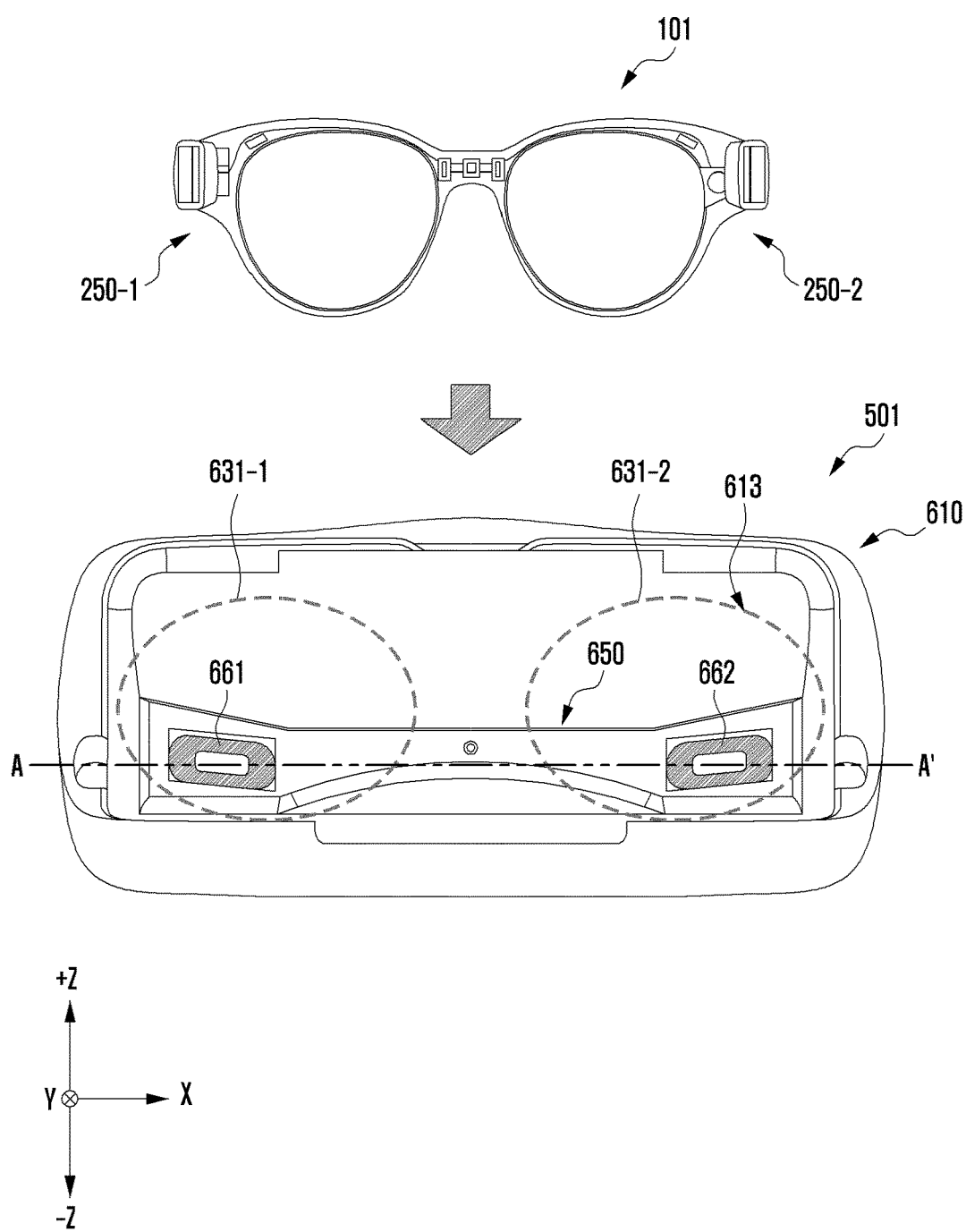
FIG. 7 illustrates a direction in which the wearable device is seated in the charging device according to an embodiment.

FIG. 7 illustrates a direction in which the wearable device 101 according to an embodiment is seated in the charging device 501.

Figure 8:
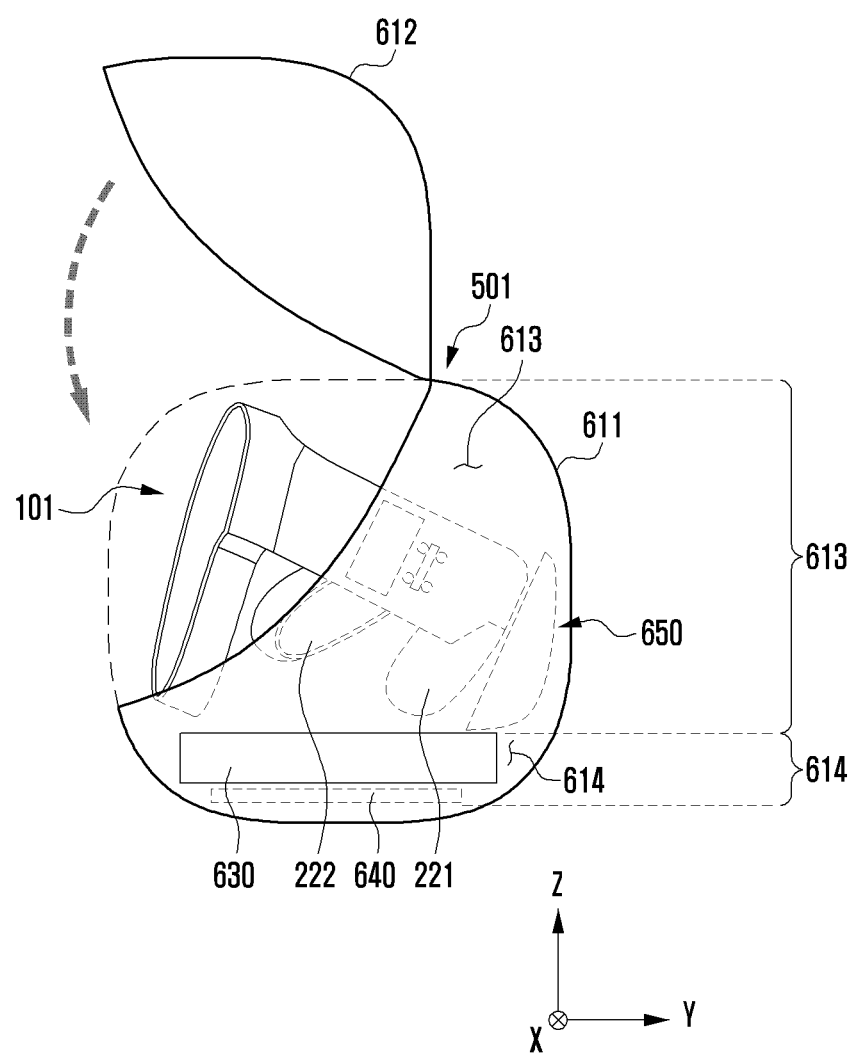
FIG. 8 is a side view illustrating the state in which the wearable device according to an embodiment is seated in the charging device.

FIG. 8 is a side view illustrating the state in which the wearable device according to various embodiments is seated in the charging device.

With reference to FIG. 7, line AA' may be a virtual line that connects the areas where the first transmission antenna 661 and the second transmission antenna 662 are disposed.

With reference to FIGS. 7 and 8, the wearable device 101 may be seated in the charging device 501. The wearable device 101 may be seated to be disposed in at least some area of the space (e.g., the first space 613) formed by the housing 610 of the charging device 501. With reference to FIG. 7, the wearable device 101 may be moved from the +z axis direction to the −z axis direction with respect to the charging device 501, and may be inserted into the first space 613.

With reference to FIGS. 7 and 8, the wearable device 101 may be disposed so that the main body part (e.g., the main body part 223 in FIG. 2) thereof is directed toward the direction (e.g., direction opposite to the +y axis direction) toward the outside of the first space 613, and may be seated in the charging device 501. According to an embodiment, when seated in the charging device 501, the wearable device 101 may be supported by the support part 650. The wearable device 101 may be seated in the charging device 501 by being brought into contact with the support part 650. According to an embodiment, the wearable device 101 may include a plurality of leg members (e.g., the first leg member 221 and/or the second leg member 222), and may be seated in the charging device 501 so that at least one of the plurality of leg members comes into contact with the support part 650. With reference to FIGS. 7 and 8, the wearable device 101 may be disposed in the charging device 501 so that the plurality of antennas (hereinafter the first reception antenna 250-1 and/or the second reception antenna 250-2) included in the wearable device 101 is adjacent to a plurality of antennas (e.g., the first transmission antenna 661, the second transmission antenna 662) included in the charging device 501. According to an embodiment, the magnetic field radiated to wirelessly deliver power from the plurality of antennas (e.g., the first transmission antenna 661 and/or the second transmission antenna 662) included in the charging device 501 to the plurality of antennas (e.g., the first reception antenna 250-1 and/or the second reception antenna 250-2) included in the wearable device 101 may be validly transmitted and received only at a distance of 1 cm to 3 cm or less. According to an embodiment, the wearable device 101 may be seated in the charging device 501 so that the antennas of the wearable device 101 fall within the range in which wireless power transmission and reception to and from the antennas of the charging device 501 are validly possible. According to an embodiment, the support part 650 may be moved within the area where the first space 613 is formed, and may be moved so that the antennas of the wearable device 101 seated in the charging device 501 fall within the range in which wireless power transmission and reception to and from the antennas of the charging device 501 are validly possible. According to an embodiment, the processor 580 of the charging device 501 may move the support part 650 by controlling the driving part (not illustrated) so that antennas (e.g., the first reception antenna 250-1 and/or the second reception antenna 250-2) of the wearable device 101 seated in the charging device 501 fall within the range in which wireless power transmission and reception to and from antennas (e.g., the first transmission antenna 661 and/or the second transmission antenna 662) of the charging device 501 are validly possible.

Figure 9:
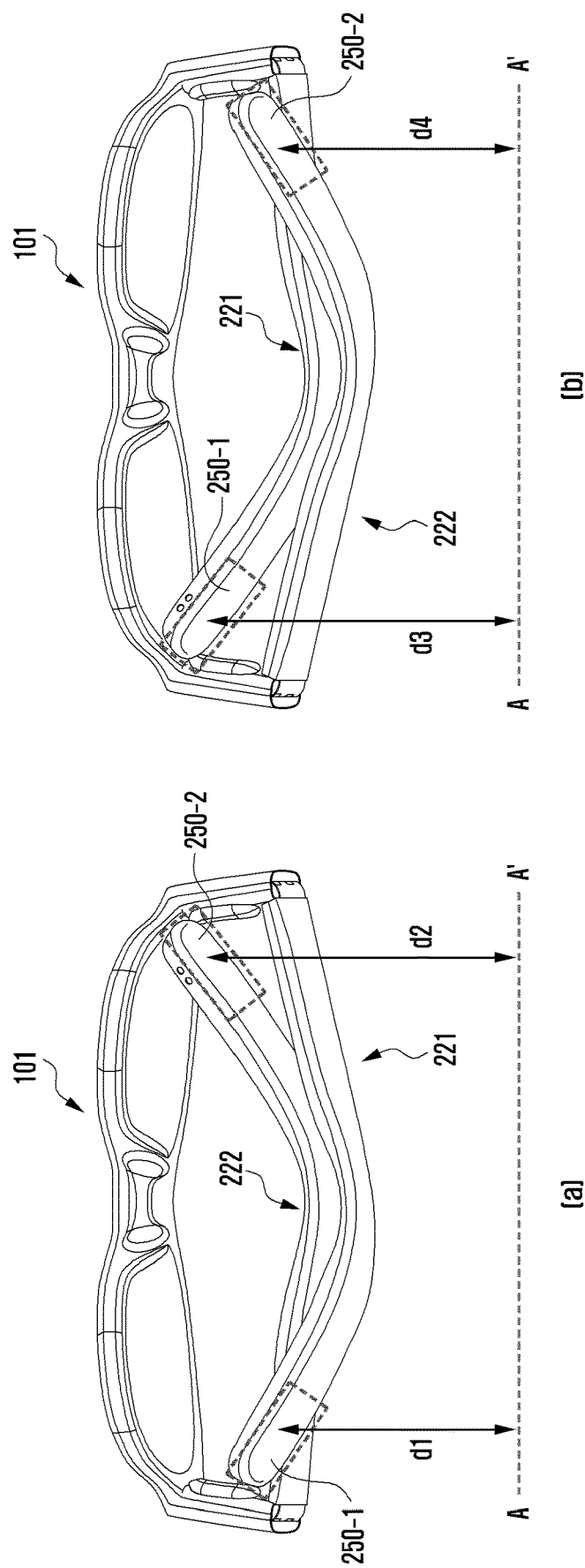
FIG. 9 illustrates a difference between the locations of antennas according to a folding order of the leg members of the wearable device according to an embodiment.

FIG. 9 illustrates a difference between the locations of antennas according to a folding order of the leg members of the wearable device 101 according to an embodiment.

With reference to FIG. 9, the wearable device 101 may include the first leg member 221 and the second leg member 222. According to an embodiment, the wearable device 101 may include the first reception antenna 250-1 in the first leg member 221. With reference to FIG. 9, the first leg member 221 and the second leg member 222 may be rotatably connected to a main body part (e.g., the main body part 223 in FIG. 2). After one of the plurality of leg members (e.g., the first leg member 221 and the second leg member 222) is folded, the other of the plurality of leg members may be sequentially folded. According to an embodiment, the wearable device 101 may include the second reception antenna 250-2 in the second leg member 222. With reference to FIG. 9, line AA' may be line AA' in FIG. 7. Line AA' may be the virtual line that connects the areas where the first transmission antenna 661 and the second transmission antenna 662 in FIG. 7 are disposed.

With reference to FIG. 9, the distance between line AA' and each of antennas (e.g., the first reception antenna 250-1 and the second reception antenna 250-2) may be different depending on the folding order of a plurality of leg members (e.g., the first leg member 221 and the second leg member 222) of the wearable device 101. The distance between a reception antenna (e.g., the first reception antenna 250-1 and/or the second reception antenna 250-2) and a transmission antenna (e.g., the first transmission antenna 661 and the second transmission antenna 662) in which wireless power transmission and reception may be valid may be 1 cm to 3 cm or less. For wireless power transmission and reception, reception intensity of the magnetic field radiated by a transmission antenna may be inversely proportional to the distance between antennas. Accordingly, reception sensitivity of the magnetic field may be different due to the difference between distances of antennas even within the distance range in which power can be validly transmitted and received.

With reference to [a] of FIG. 9, after the second leg member 222 is folded, the first leg member 221 may be folded. In the state in which all of the leg members (e.g., the first leg member 221 and the second leg member 222) have been folded, the plurality of leg members may have an overlap area. Accordingly, the leg member (e.g., the first leg member 221) folded later may be disposed to be closer to the line AA', due to the area physically occupied by the thickness of the first leg member that was folded. According to an embodiment, if the first leg member 221 is folded later than the second leg member 222, the first reception antenna 250-1 may be disposed to be closer to line AA' than the second reception antenna 250-2. With reference to [a] of FIG. 9, the first reception antenna 250-1 may form a straight-line distance d1 to the line AA', and the second reception antenna 250-2 may form a straight-line distance d2 to the line AA'. D1 may be the distance between the first reception antenna 250-1 and a first transmission antenna (e.g., the first transmission antenna 661 in FIG. 7). D2 may be a distance between the second reception antenna 250-2 and a second transmission antenna (e.g., the second transmission antenna 662 in FIG. 7). According to an embodiment, when the wearable device 101 is seated in a charging device (e.g., the charging device 501 in FIG. 7) in the state in which the first leg member 221 is folded second, d1 may be smaller than d2.

With reference to [b] of FIG. 9, after the first leg member 221 is folded, the second leg member 222 may be folded. In the state in which all of the leg members have been folded, the later-folded leg member (e.g., the second leg member 222) may be disposed to be closer to the virtual line AA'. According to an embodiment, if the second leg member 222 is folded later than the first leg member 221, the second reception antenna 250-2 may be disposed to be closer to the line AA' than the first reception antenna 250-1. With reference to [b] of FIG. 9, the first reception antenna 250-1 may form a straight-line distance d3 to the line AA', and the second reception antenna 250-2 may form a straight-line distance d4 to the line AA'. d3 may be the distance between the first reception antenna 250-1 and the first transmission antenna (e.g., the first transmission antenna 661 in FIG. 7). d4 may be the distance between the second reception antenna 250-2 and the second transmission antenna (e.g., the second transmission antenna 662 in FIG. 7). According to an embodiment, when the wearable device 101 is seated in the charging device (e.g., the charging device 501 in FIG. 7) when the second leg member 222 is folded second, d3 may be longer than d4.

Figure 10:
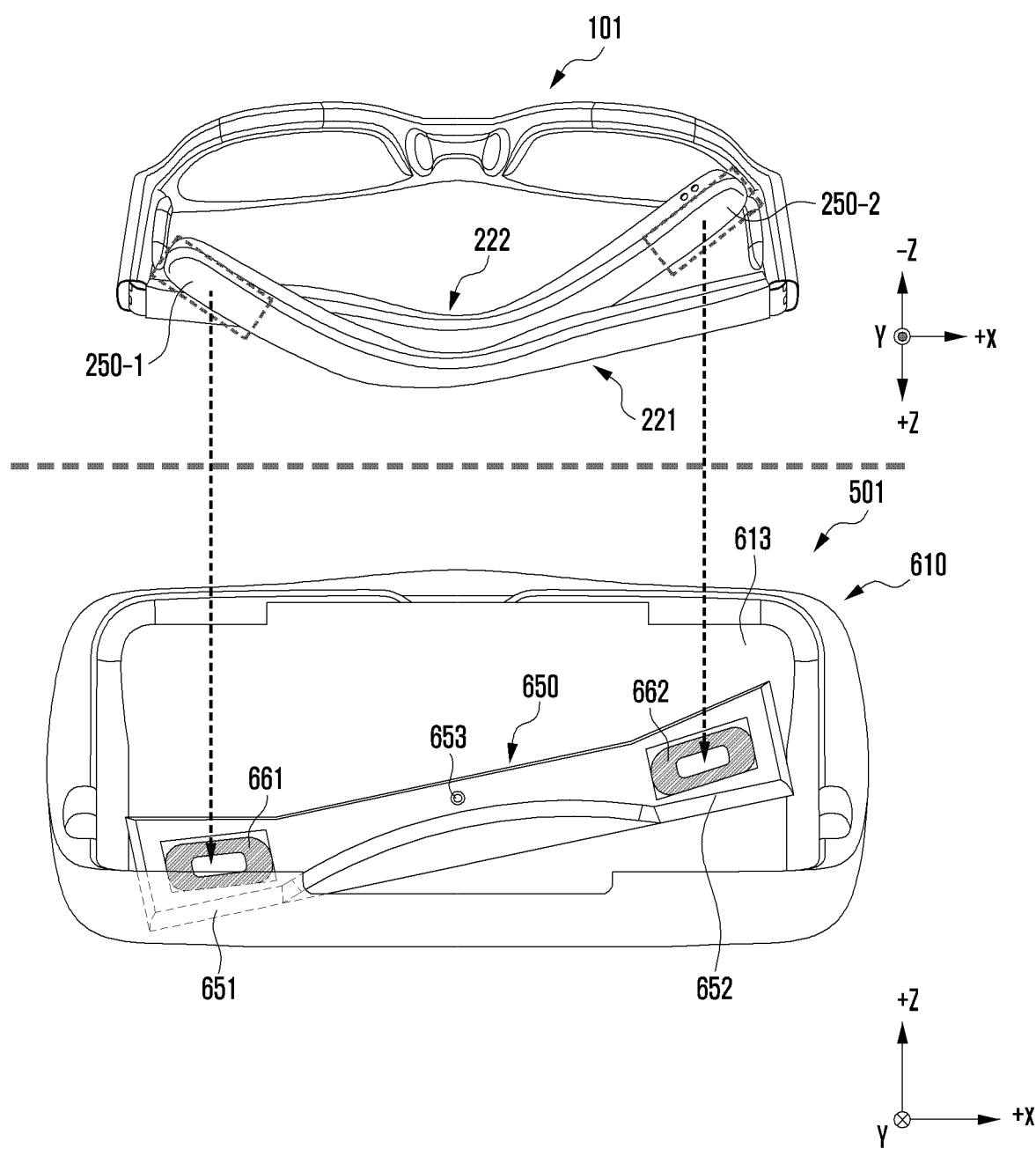
FIGS. 10 and 11 illustrate deformations of the charging device according to the folding order according to an embodiment.
Figure 11:
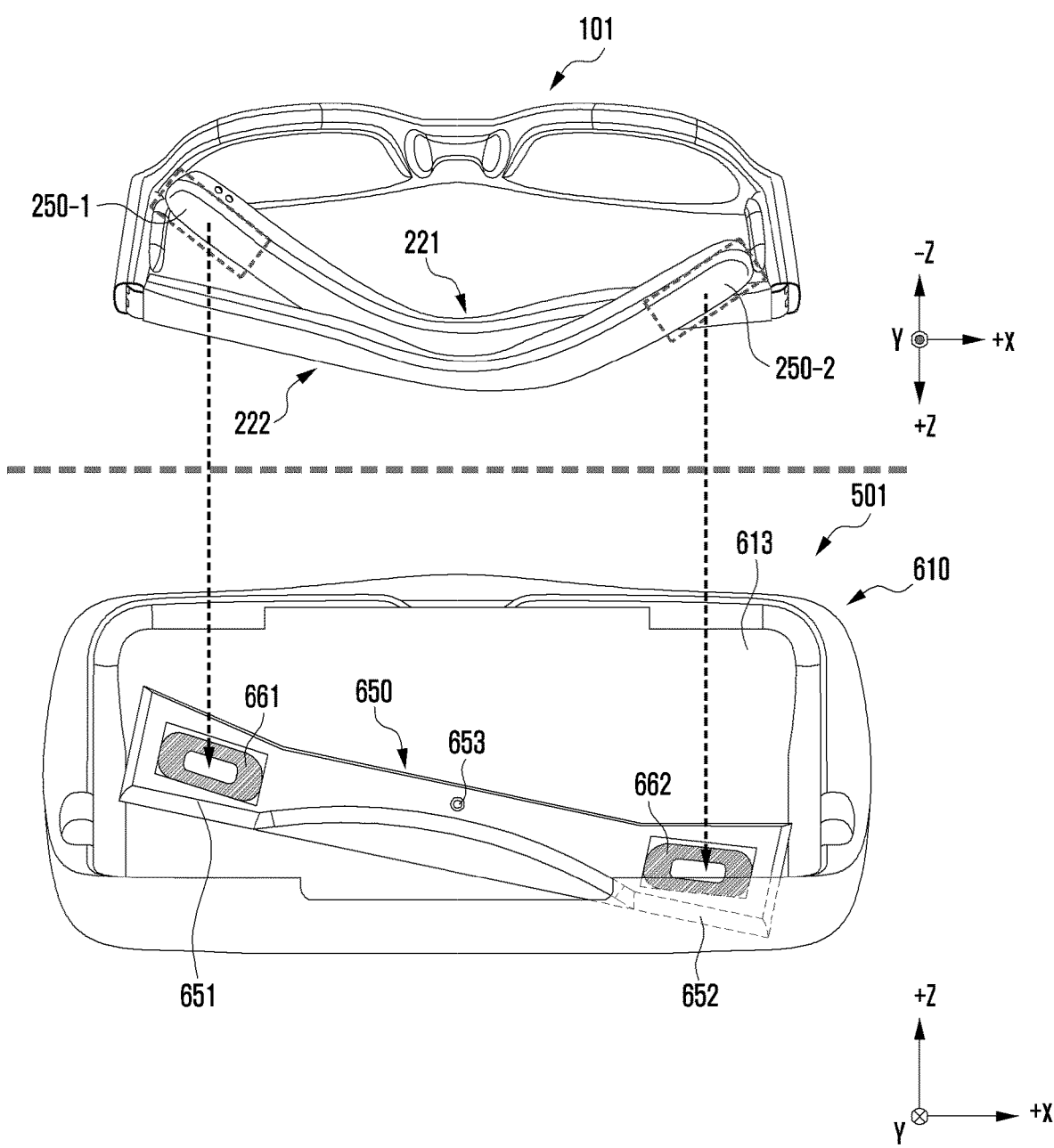

FIGS. 10 and 11 illustrate deformations of the charging device according to a folding order according to an embodiment.

With reference to FIGS. 10 and 11, the support part 650 of the charging device 501 may be moved based on the folding order of the plurality of leg members (e.g., the first leg member 221 and the second leg member 222) included in the wearable device 101.

With reference to FIGS. 10 and 11, the wearable device 101 may be inserted into the charging device 501. To illustrate the folding order of the leg members, the wearable device 101 in FIGS. 10 and 11 have been flipped upside down as compared to the wearable device shown in FIG. 7.

With reference to FIGS. 10 and 11, the locations of antennas (e.g., the first reception antenna 250-1 and the second reception antenna 250-2) included in the wearable device 101 may be different depending on the folding order of the antennas. If wireless charging is performed, reception (e.g., the reception of the magnetic field) may need to be performed substantially at the same speed in the plurality of reception antennas. Accordingly, the locations of the plurality of antennas (e.g., the first transmission antenna 661 and the second transmission antenna 662)) included in the charging device 501 may need to be changed based on the folding order of the leg members of the wearable device 101. According to an embodiment, transmission antennas (e.g., the first transmission antenna 661 and the second transmission antenna 662) of the charging device 501 may be seated in the support part 650. The support part 650 may be moved according to the folding order of the leg members of the wearable device 101. According to an embodiment, the support part 650 may be disposed in the first space 613 and connected to the housing 610 through the connection part 653. The connection part 653 may connect the support part 650 to the housing 610 so that the support part 650 may be moved within the first space 613. For example, the support part 650 may be disposed in a way to be rotated and moved, tilted and moved and/or moved up and down. Furthermore, for example, the connection part 653 may include at least one of a rotation axis, a tilt axis, and an elastic member. When the wearable device 101 is seated in the charging device 501, the support part 650 may support the wearable device 101. According to an embodiment, the support part 650 may be moved by the seating of the wearable device 101. For example, the support part 650 may come into contact with the seated wearable device 101, and may be moved by the weight of the wearable device 101. Furthermore, for example, the support part 650 may be moved by the driving part (not illustrated) controlled by a processor (e.g., the processor 580 in FIG. 4), in which the driving part is supplied with power. The first transmission antenna 661 and/or the second transmission antenna 662 may be disposed in at least some area of the support part 650 disposed in the first space 613. The first space 613 may include a first area (e.g., the first area 613-1 in FIG. 6) and a second area (e.g., the second area 613-2 in FIG. 6). According to an embodiment, the first transmission antenna 661 may be disposed at a location corresponding to the first area 613-1. According to an embodiment, the second transmission antenna 662 may be disposed at a location corresponding to the second area 613-2. For example, the first transmission antenna 661 may radiate magnetic field in the direction toward the first area 613-1. Furthermore, for example, the second transmission antenna 662 may radiate magnetic field in the direction toward the second area 613-2.

With reference to FIG. 10, when the wearable device 101 is in the folding state in the folding order of the second leg member 222 and then the first leg member 221, the support part 650 of the charging device 501 may be moved based on the folding order. According to an embodiment, the support part 650 may be rotated and moved or tilted and moved by the connection part 653. According to an embodiment, when the wearable device 101 is seated in the charging device 501, the support part 650 may come into contact with the first leg member 221 first of all. According to an embodiment, the support part 650 may be counterclockwise rotated and moved by being weighted by the first leg member 221. According to an embodiment, the support part 650 may be tilted and moved by being weighted by the first leg member 221 so that the second transmission antenna 662 is moved upward (e.g., the +z axis direction) and the first transmission antenna 661 is moved downward (e.g., the −z axis direction). The support part 650 may be rotated and moved and/or tilted and moved, so that the distance between the first transmission antenna 661 and the first reception antenna 250-1 and the distance between the second transmission antenna 662 and the second reception antenna 250-2 can be substantially identically maintained.

With reference to FIG. 11, when the wearable device 101 is in the folding state in the folding order of the first leg member 221 and then the second leg member 222, the support part 650 of the charging device 501 may be moved based on the folding order. According to an embodiment, the support part 650 may be rotated and moved or tilted and moved by the connection part 653. According to an embodiment, when the wearable device 101 is seated in the charging device 501, the support part 650 may come into contact with the second leg member 222 first of all. According to an embodiment, the support part 650 may be clockwise rotated and moved by being weighted by the second leg member 222. According to an embodiment, the support part 650 may be tilted and moved by being weighted by the second leg member 222 so that the first transmission antenna 661 is moved upward (e.g., the +z axis direction) and the second transmission antenna 662 is moved downward (e.g., the −z axis direction). The support part 650 may be rotated and moved and/or tilted and moved, so that the distance between the first transmission antenna 661 and the first reception antenna 250-1 and the distance between the second transmission antenna 662 and the second reception antenna 250-2 can be substantially identically maintained.

Figure 12:
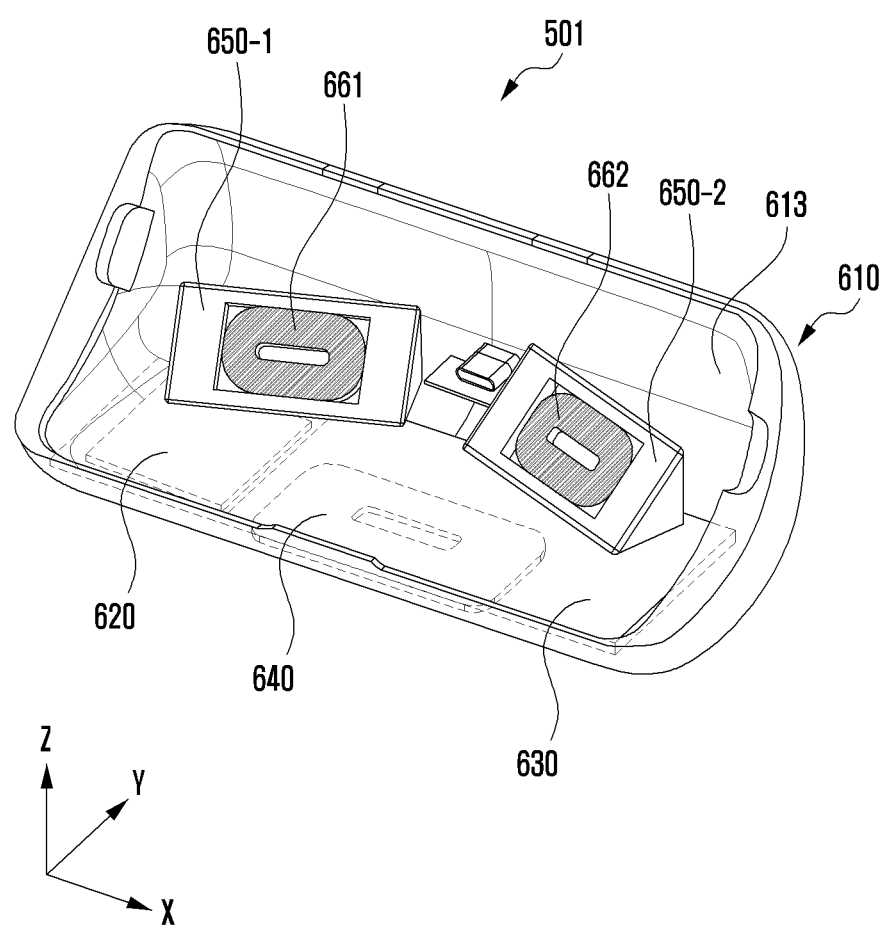
FIG. 12 is a perspective view of the charging device according to an embodiment.

FIG. 12 is a perspective view of the charging device according to an embodiment.

Figure 13:
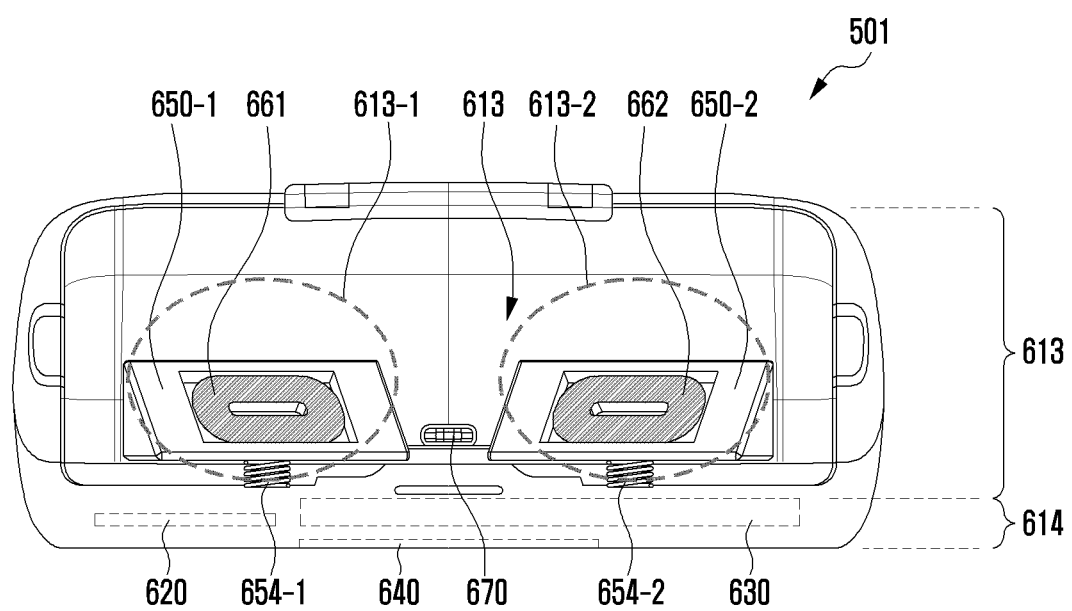
FIG. 13 is a front view of the charging device according to an embodiment.

FIG. 13 is a front view of the charging device according to an embodiment.

With reference to FIGS. 12 and 13, the charging device 501 may include the housing 610, the PCB 620, the battery 630, the support part 650, the first transmission antenna 661, the second transmission antenna 662, the third antenna 640 and/or the connection terminal 670. The outside of the charging device 501 may be implemented by the housing 610. According to an embodiment, various components included in the charging device 501 may be disposed in the housing 610.

With reference to FIGS. 12 and 13, the housing 610 may include the first housing 611 and/or the second housing 612. According to an embodiment, the second housing 612 may form a cover and may be operatively connected to the first housing 611. According to an embodiment, the second housing 612 may be connected to the first housing 611 through at least one hinge, and may rotate to open and close the charging device 501. The charging device 501 may identify whether the charging device 501 has been opened or closed, whether an external electronic device (e.g., the wearable device 101 in FIG. 2) has been seated in the charging device 501 and/or the folding order of the leg members of the wearable device 101. For example, the charging device 501 may identify information about whether the charging device 501 has been opened or closed, whether the external electronic device has been seated in the charging device 501 and/or the folding order by using a sensor (e.g., the sensor module 520 in FIG. 4) included in the charging device 501 or by receiving data from the wearable device 101. The housing 610 may include the first space 613 in which an external electronic device (e.g., the wearable device 101 in FIG. 2) may be seated. The first space 613 may be an internal space formed by the first housing 611 and the second housing 612. According to an embodiment, components of the charging device 501 may be disposed in the first space 613. According to an embodiment, the housing 610 may include the second space 614. The second space 614 may be a space formed within the first housing 611. According to an embodiment, components of the charging device 501 may be disposed in the second space 614.

With reference to FIGS. 12 and 13, a support part (e.g., first support part 650-1 and second support part 650-2), the first transmission antenna 661 and/or the second transmission antenna 662 may be disposed in the first space 613. According to an embodiment, the first support part 650-1 and the second support part 650-2 may be separated and isolated from each other. A support part (e.g., the first support part 650-1 and the second support part 650-2) may be disposed in the first space 613 and connected to the housing 610 through a connection part (e.g., first connection part 654-1 and second connection part 654-2). According to an embodiment, each of the first support part 650-1 and/or the second support part 650-2 may be disposed to be moved up and down independently of each other. A connection part (e.g., the first connection part 654-1 and the second connection part 654-2) may connect a support part (e.g., the first support part 650-1 and the second support part 650-2) to the housing 610 so that the support part (e.g., the first support part 650-1 and the second support part 650-2) may be moved within the first space 613. According to an embodiment, a connection part (e.g., the first connection part 654-1 and the second connection part 654-2) may include an elastic member having elastic force such as a spring. A support part (e.g., the first support part 650-1 and the second support part 650-2) may support an external electronic device (e.g., the wearable device 101 in FIG. 2) when the external electronic device is seated in the charging device 501. According to an embodiment, a support part (e.g., the first support part 650-1 and the second support part 650-2) may be moved by the seating of an external electronic device (e.g., the wearable device 101 in FIG. 2). For example, a support part (e.g., the first support part 650-1 and the second support part 650-2) may come into contact with the seated wearable device 101, and may be moved by the weight of the wearable device 101. For example, a support part (e.g., the first support part 650-1 and the second support part 650-2) may be moved downward (e.g., a −z axis direction) by the weight of the wearable device 101. According to an embodiment, the first support part 650-1 and the second support part 650-2 may be independently moved by the pressurization of the wearable device 101. When the wearable device 101 is detached from the charging device 501 and pressure thereof is removed, the first support part 650-1 and/or the second support part 650-2 may be moved upward (e.g., the +z axis direction), restored by the elastic force stored in the compressed connection part (e.g., the first connection part 654-1 and/or the second connection part 654-2).

With reference to FIGS. 12 and 13, the first transmission antenna 661 and/or the second transmission antenna 662 may be disposed in at least some area of a plurality of support parts (e.g., the first support part 650-1 and/or the second support part 650-2) disposed in the first space 613. The first space 613 may include the first area 613-1 and the second area 613-2. According to an embodiment, the support part 650-1 and 650-2 may include the first support part 650-1 disposed at a location corresponding to the first area 613-1 and the second support part 650-2 disposed in the second area 613-2. According to an embodiment, the first transmission antenna 661 may be disposed at a location corresponding to the first area 613-1. For example, the first transmission antenna 661 may be disposed in the first support part 650-1. According to an embodiment, the second transmission antenna 662 may be disposed at a location corresponding to the second area 613-2. For example, the second transmission antenna 662 may be disposed in the second support part 650-2. According to an embodiment, the first transmission antenna 661 may radiate a magnetic field in a direction toward the first area 613-1. Furthermore, for example, the second transmission antenna 662 may radiate a magnetic field in a direction toward the second area 613-2.

With reference to FIGS. 12 and 13, the PCB 620, the battery 630 and/or the third antenna 640 may be disposed in the second space 614. The PCB 620 may deliver electrical signals to each of the components of the charging device 501. The PCB 620 may be electrically connected to components of the charging device 501, such as the battery 630, the connection terminal 670 and/or an antenna (e.g., the first transmission antenna 661, the second transmission antenna 662 and/or the third antenna 640), and may deliver electrical signals between the components. The charging device 501 may be connected to an external electronic device (not illustrated) through the connection terminal 670 (e.g., the connection terminal 530 in FIG. 4) (e.g., USB TYPE-C). The battery 630 (e.g., the battery 550 in FIG. 4) may be disposed in the second space 614, and may supply power to or receive power from each of the components of the charging device 501. The third antenna 640 may be disposed in the second space 614, and may wirelessly receive power from the outside (e.g., an external electronic device). For example, the third antenna 640 may generate an induced current from an external magnetic field, and may deliver the generated current to a power management module (e.g., the power management module 540 in FIG. 4) and/or the battery 630. The third antenna 640 may be disposed to receive, from the outside of the housing 610, magnetic field radiated in the direction (e.g., the +z axis direction) toward the inside (e.g., the first space 613) of the housing 610.

Figure 14:
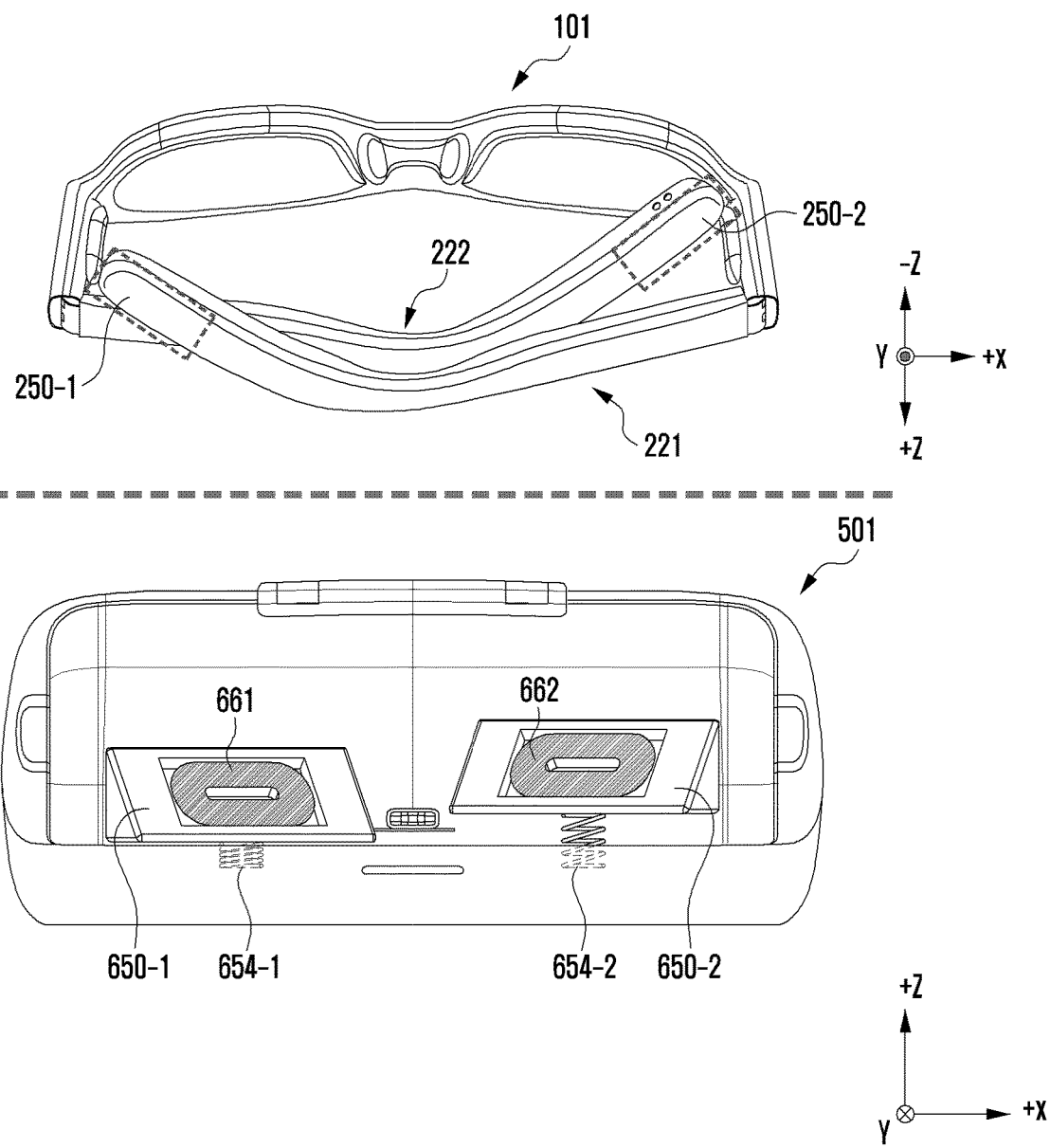
FIGS. 14 and 15 illustrate deformations of the charging device according to the folding order according to an embodiment.
Figure 15:
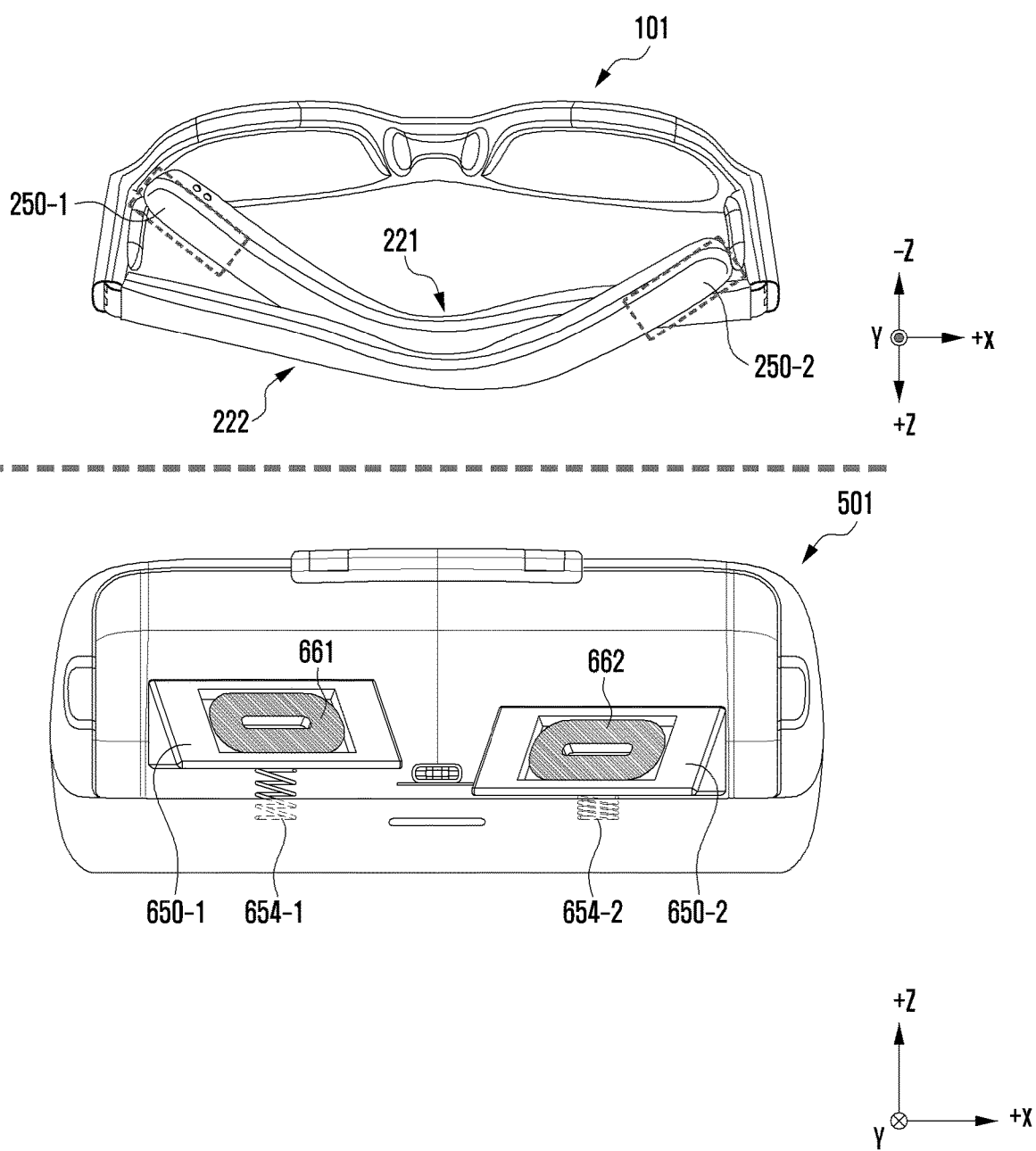

FIGS. 14 and 15 illustrate deformations of the charging device according to a folding order according to an embodiment.

With reference to FIGS. 14 and 15, the support parts 650-1 and 650-2 of the charging device 501 may be moved based on the folding order of a plurality of leg members (e.g., the first leg member 221 and the second leg member 222) included in the wearable device 101.

With reference to FIGS. 14 and 15, the locations of antennas (e.g., the first reception antenna 250-1 and the second reception antenna 250-2) included in the wearable device 101 may be different depending on the folding order of leg members. If wireless charging is performed, reception (e.g., the reception of magnetic field) may need to be performed substantially at the same speed in the plurality of reception antennas. Accordingly, the locations of the plurality of antennas (e.g., the first transmission antenna 661 and the second transmission antenna 662)) included in the charging device 501 may need to be changed based on the folding order of the leg members of the wearable device 101. According to an embodiment, a transmission antenna (e.g., the first transmission antenna 661 and the second transmission antenna 662) of the charging device 501 may be seated in a support part (e.g., the first support part 650-1 and the second support part 650-2). A support part (e.g., the first support part 650-1 and the second support part 650-2) may be moved based on the folding order of the leg members of the wearable device 101. According to an embodiment, a support part (e.g., the first support part 650-1 and the second support part 650-2) may be disposed in the first space 613, and may be connected to the housing 610 through a connection part (e.g., the first connection part 654-1 and the second connection part 654-2). A connection part (e.g., the first connection part 654-1 and the second connection part 654-2) may connect a support part (e.g., the first support part 650-1 and the second support part 650-2) to the housing 610 so that the support part (e.g., the first support part 650-1 and the second support part 650-2) may be moved within the first space 613. For example, a support part (e.g., the first support part 650-1 and the second support part 650-2) may be disposed to be moved up and down. Furthermore, for example, a connection part (e.g., the first connection part 654-1 and the second connection part 654-2) may include an elastic member. A support part (e.g., the first support part 650-1 and the second support part 650-2) may support the wearable device 101 when the wearable device 101 is seated in the charging device 501. According to an embodiment, a support part (e.g., the first support part 650-1 and the second support part 650-2) may be moved by the seating of the wearable device 101. For example, the support part 650 may come into contact with the seated wearable device 101, and may be moved by the weight of the wearable device 101. The first transmission antenna 661 and/or the second transmission antenna 662 may be disposed in at least some area of a support part (e.g., the first support part 650-1 and the second support part 650-2) disposed in the first space 613. The first space 613 may include a first area (e.g., the first area 613-1 in FIG. 6) and a second area (e.g., the second area 613-2 in FIG. 6). According to an embodiment, the first transmission antenna 661 may be disposed at a location corresponding to the first area 613-1. According to an embodiment, the second transmission antenna 662 may be disposed at a location corresponding to the second area 613-2. For example, the first transmission antenna 661 may radiate magnetic field in the direction toward the first area 613-1. Furthermore, for example, the second transmission antenna 662 may radiate magnetic field in the direction toward the second area 613-2.

With reference to FIG. 14, when the wearable device 101 is in the folding state in the folding order of the second leg member 222 and then the first leg member 221, a support part (e.g., the first support part 650-1 and the second support part 650-2) of the charging device 501 may be moved based on the folding order. According to an embodiment, a support part (e.g., the first support part 650-1 and the second support part 650-2) may be moved up and down due to the elastic nature of the corresponding connection part (e.g., the first connection part 654-1 and the second connection part 654-2). According to an embodiment, when the wearable device 101 is seated in the charging device 501, the first support part 650-1 may be weighted and moved downward (e.g., the −z axis direction in FIG. 13) by the first leg member 221, and the second support part 650-2 may be weighted and moved downward (e.g., the −z axis direction in FIG. 13) by the second leg member 222. According to an embodiment, the distance that the first support part 650-1 is moved may be greater than the distance that the second support part 650-2 is moved. According to an embodiment, support parts (e.g., the first support part 650-1 and the second support part 650-2) may be weighted by the first leg member 221 and the second leg member 222, so that the first transmission antenna 661 and the second transmission antenna 662 disposed in the support parts (e.g., the first support part 650-1 and the second support part 650-2) may be moved downward (e.g., the −z axis direction in FIG. 13) in the state in which the first transmission antenna 661 and the second transmission antenna 662 are in proximity with the first reception antenna 250-1 and the second reception antenna 250-2, respectively. A plurality of support parts (e.g., the first support part 650-1 and the second support part 650-2) may be moved downward at different distances, so that the distance between the first transmission antenna 661 and the first reception antenna 250-1 and the distance between the second transmission antenna 662 and the second reception antenna 250-2 can be substantially identically maintained.

With reference to FIG. 15, when the wearable device 101 is in the folding state in the folding order of the first leg member 221 and then the second leg member 222, support parts (e.g., the first support part 650-1 and the second support part 650-2) of the charging device 501 may be moved based on the folding order. According to an embodiment, support parts (e.g., the first support part 650-1 and the second support part 650-2) may be moved up and down by connection parts (e.g., the first connection part 654-1 and the second connection part 654-2). According to an embodiment, when the wearable device 101 is seated in the charging device 501, the first support part 650-1 may be weighted and moved downward (e.g., the −z axis direction in FIG. 13) by the first leg member 221, and the second support part 650-2 may be weighted and moved downward (e.g., the −z axis direction in FIG. 13) by the second leg member 222. According to an embodiment, the distance that the first support part 650-1 is moved may be smaller than the distance that the second support part 650-2 is moved. According to an embodiment, support parts (e.g., the first support part 650-1 and the second support part 650-2) may be weighted by the first leg member 221 and the second leg member 222, so the first transmission antenna 661 and the second transmission antenna 662 disposed in the support parts (e.g., the first support part 650-1 and the second support part 650-2) may be moved downward (e.g., a direction opposite to the z axis direction in FIG. 13) in the state in which the first transmission antenna 661 and the second transmission antenna 662 are in proximity with the first reception antenna 250-1 and the second reception antenna 250-2, respectively. A plurality of support parts (e.g., the first support part 650-1 and the second support part 650-2) may be moved downward at different distances, so the distance between the first transmission antenna 661 and the first reception antenna 250-1 and the distance between the second transmission antenna 662 and the second reception antenna 250-2 can be substantially identically maintained.

Figure 16:
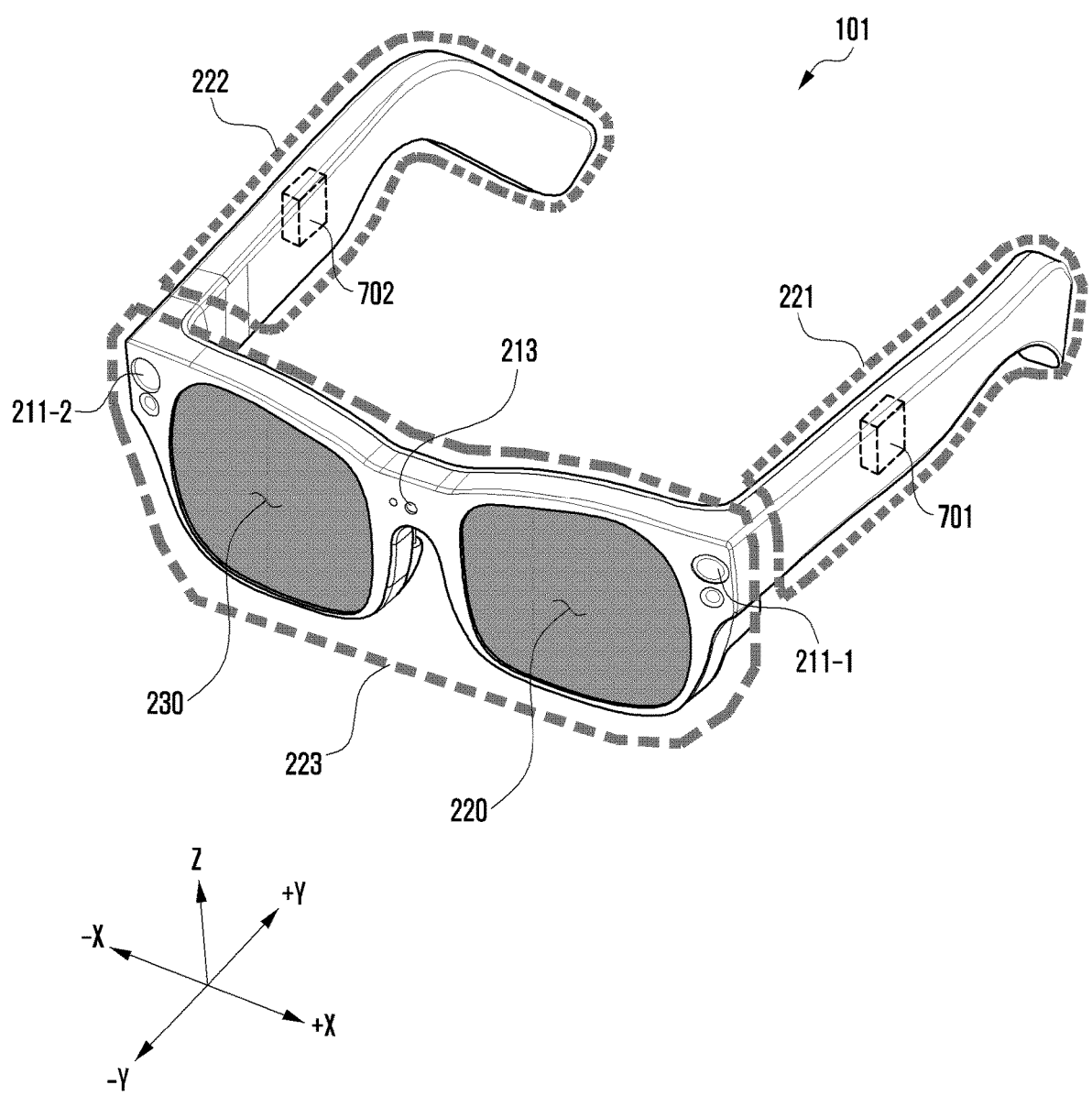
FIGS. 16, 17 and 18 illustrate the wearable device including a sensor according to certain embodiments.
Figure 17:
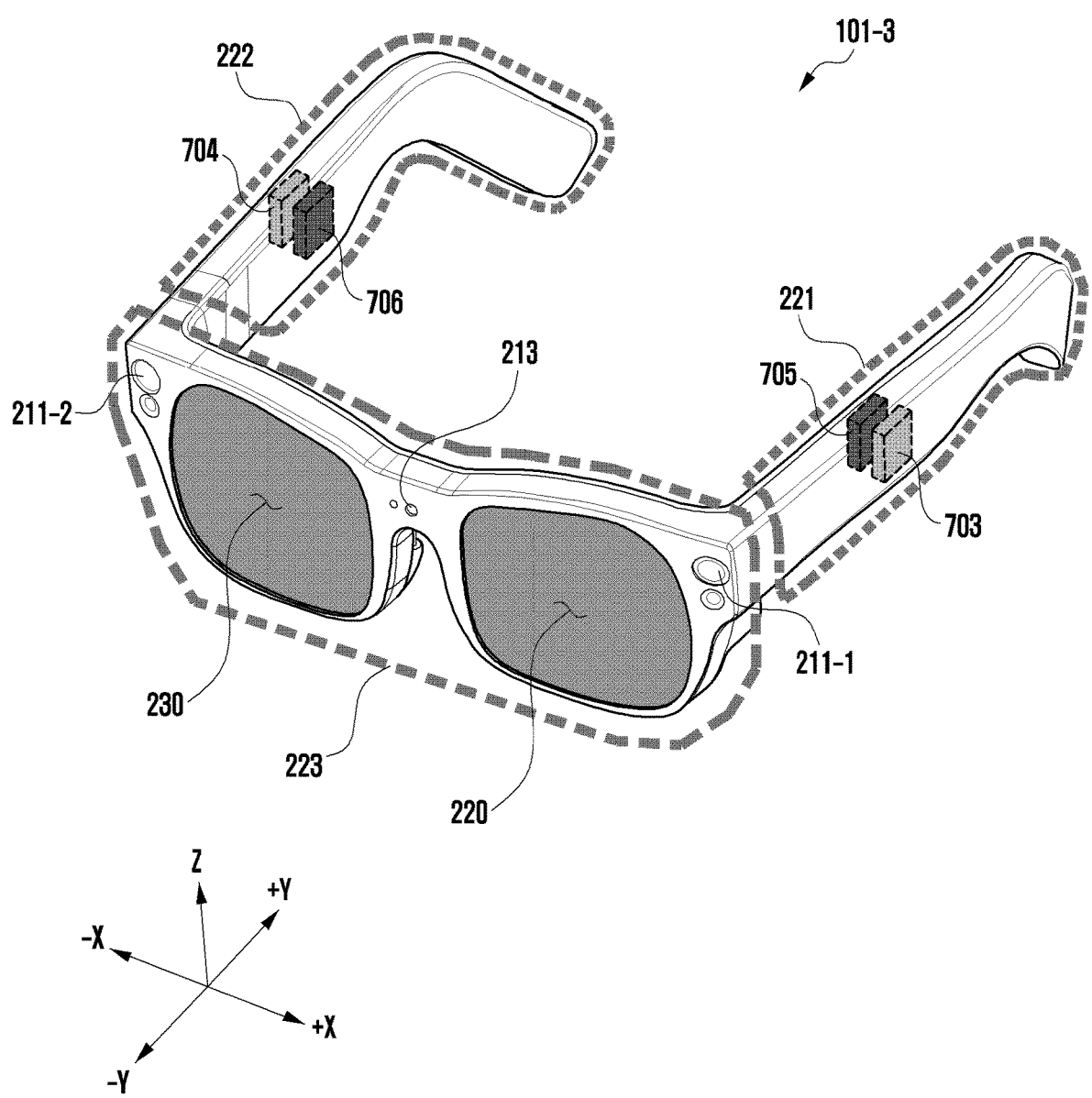
Figure 18:
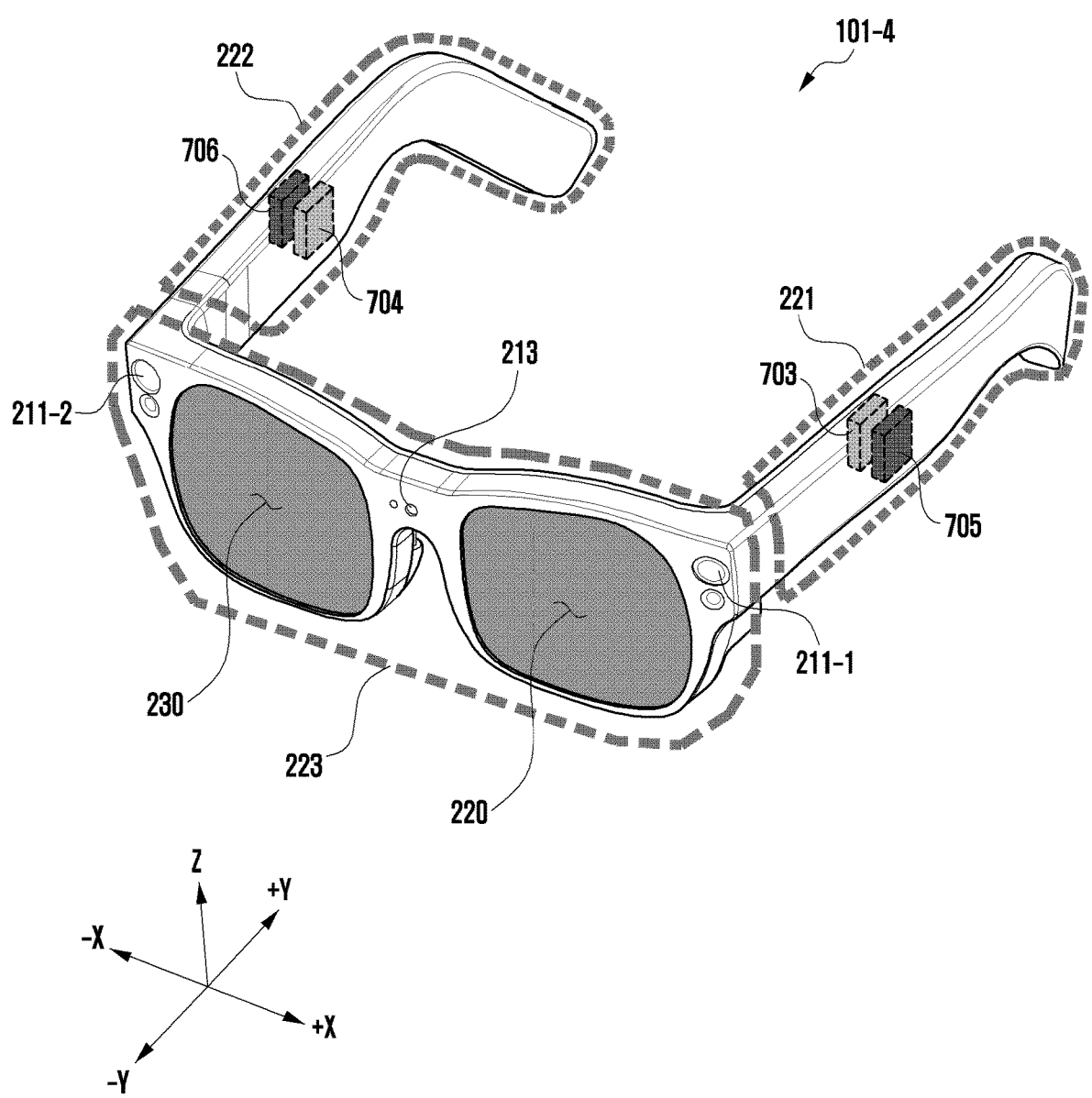

FIGS. 16, 17 and 18 illustrate a wearable device including a sensor according to certain embodiments.

With reference to FIGS. 16, 17 and 18, the wearable device 101, 101-3, 101-4 may include at least one sensor 701, 702, 703, and 704. According to an embodiment, at least one sensor 701, 702, 703, and 704 mounted on the wearable device 101 may be mounted on at least some area of the main body part 223 and/or a leg member (e.g., the first leg member 221 and/or the second leg member 222) of the wearable device 101, 101-3, 101-4.

With reference to FIG. 16, the wearable device 101 may include two or more sensors (e.g., the first sensor 701 and the second sensor 702). According to an embodiment, the first sensor 701 may be disposed in the first leg member 221, and the second sensor 702 may be disposed in the second leg member 222. According to an embodiment, the first sensor 701 and/or the second sensor 702 may include an acceleration sensor and/or a gyro sensor. The first sensor 701 and/or the second sensor 702 may be operatively connected to a processor (e.g., the processor 120 in FIG. 1), and may be electrically connected to the PCBs 231-1 and 231-2. According to an embodiment, the first sensor 701 and/or the second sensor 702 may detect movement of the corresponding leg member (e.g., the first leg member 221 and/or the second leg member 222). According to an embodiment, the first sensor 701 may detect movement of the first leg member 221, and may transmit the detected movement information to a processor (e.g., the processor 120 in FIG. 1). According to an embodiment, the second sensor 702 may detect movement of the second leg member 222, and may transmit the detected movement information to the processor 120.

With reference to FIGS. 16 and 17, the wearable device 101-3, 101-4 may include two or more sensors (e.g., the third sensor 703 and the fourth sensor 704. According to an embodiment, the third sensor 703 may be disposed in the first leg member 221, and the fourth sensor 704 may be disposed in the second leg member 222. According to an embodiment, the third sensor 703 and/or the fourth sensor 704 may include a magnetic sensor. The third sensor 703 and/or the fourth sensor 704 may detect the intensity of magnetic field generated at a given distance from each sensor, changes in the magnetic field, and/or the direction of the magnetic field. According to an embodiment, the wearable device 101-3, 101-4 may include at least one magnetic substance (e.g., first magnetic substance 705 and/or second magnetic substance 706) at locations corresponding to the third sensor 703 and/or the fourth sensor 704. According to an embodiment, the wearable device 101-3, 101-4 may detect movement of a leg member (e.g., the first leg member 221 and/or the second leg member 222) by using the detected change in the magnetic field, which is detected by the third sensor 703 and/or the fourth sensor 704, based on the distance between at least one magnetic substance (e.g., the first magnetic substance 705 and/or the second magnetic substance 706) and the third sensor 703 and/or the fourth sensor 704. The third sensor 703 and/or the fourth sensor 704 may be operatively connected to a processor (e.g., the processor 120 in FIG. 1), and may be electrically connected to the PCBs 231-1 and 231-2.

With reference to FIGS. 17 and 18, the third sensor 703 and/or the fourth sensor 704 may detect a movement of a leg member (e.g., the first leg member 221 and/or the second leg member 222). According to an embodiment, the third sensor 703 may detect a movement of the first leg member 221, and may transmit the detected movement information to the processor 580. According to an embodiment, the fourth sensor 704 may detect a movement of the second leg member 222, and may transmit the detected movement information to the processor 580.

With reference to FIG. 17, the third sensor 703 may be disposed in at least some area of the first leg member 221 in a way to be directed toward an outside direction (e.g., the +x axis direction in FIG. 17) of the first leg member 221. With reference to FIG. 17, the fourth sensor 704 may be disposed in at least some area of the second leg member 222 in a way to be directed toward an outside direction (e.g., the −x axis direction) of the second leg member 222. According to an embodiment, the first magnetic substance 705 may be disposed in at least some area of the first leg member 221 in a way to be directed toward an inside direction (e.g., the −x axis direction) of the first leg member 221. According to an embodiment, the second magnetic substance 706 may be disposed in at least some area of the second leg member 222 in a way to be directed toward an inside direction (e.g., the +x axis direction) of the second leg member 222. According to an embodiment, the third sensor 703 and/or the fourth sensor 704 may detect movement (e.g., the folding order) of the first leg member 221 and/or the second leg member 222. According to an embodiment, when first leg member 221 and the second leg member 222 are rotated and folded, the third sensor 703 and/or the fourth sensor 704 may detect the intensity of magnetic field and/or the change in the direction of the magnetic field due to changes between distances from the magnetic substance (e.g., the first magnetic substance 705 and the second magnetic substance 706) to the magnetic sensors and/or the locations of the magnetic components. For example, when the folding order is the order of the first leg member 221 and then the second leg member 222, the third sensor 703 may be disposed between the first magnetic substance 705 and the second magnetic substance 706, and the fourth sensor 704 may be disposed to be toward the outside (e.g., the Y axis direction). Furthermore, for example, when the folding order is the order of the second leg member 222 and then the first leg member 221, the fourth sensor 704 may be disposed between the first magnetic substance 705 and the second magnetic substance 706, and the third sensor 703 may be disposed toward the outside (e.g., the Y axis direction). According to an embodiment, values of the intensity and/or direction of the magnetic field detected by the third sensor 703 and the fourth sensor 704 may be different depending on the folding order.

With reference to FIG. 18, the third sensor 703 may be disposed in at least some area of the first leg member 221 in a way to be directed toward an inside direction (e.g., the −x axis direction) of the first leg member 221. With reference to FIG. 18, the fourth sensor 704 may be disposed in at least some area of the second leg member 222 in a way to be directed toward an inside direction (e.g., the +x axis direction) of the second leg member 222. According to an embodiment, the first magnetic substance 705 may be disposed in at least some area of the first leg member 221 in a way to be directed toward an outside direction (e.g., the +x axis direction) of the first leg member 221. According to an embodiment, the second magnetic substance 706 may be disposed in at least some area of the second leg member 222 in a way to be directed toward an outside direction (e.g., the −x axis direction) of the second leg member 222. According to an embodiment, the third sensor 703 and/or the fourth sensor 704 may detect movement (e.g., the folding order) of the first leg member 221 and/or the second leg member 222. According to an embodiment, when the first leg member 221 and the second leg member 222 are rotated and folded, the third sensor 703 and/or the fourth sensor 704 may detect the intensity of magnetic field and/or the change in the direction of the magnetic field due to changes between distances from the magnetic substance (e.g., the first magnetic substance 705 and the second magnetic substance 706) to the magnetic sensors and/or the locations of the magnetic components. For example, when the folding order is the order of the first leg member 221 and then the second leg member 222, the fourth sensor 704 may be disposed between the first magnetic substance 705 and the second magnetic substance 706, and the third sensor 703 may be disposed toward the outside (e.g., the −Y axis direction). Furthermore, for example, when the folding order is the order of the second leg member 222 and then the first leg member 221, the third sensor 703 may be disposed between the first magnetic substance 705 and the second magnetic substance 706, and the fourth sensor 704 may be disposed toward the outside (e.g., the −y axis direction). According to an embodiment, values of the intensity and/or direction of the magnetic field detected by the third sensor 703 and the fourth sensor 704 may be different depending on a folding order.

Figure 19:
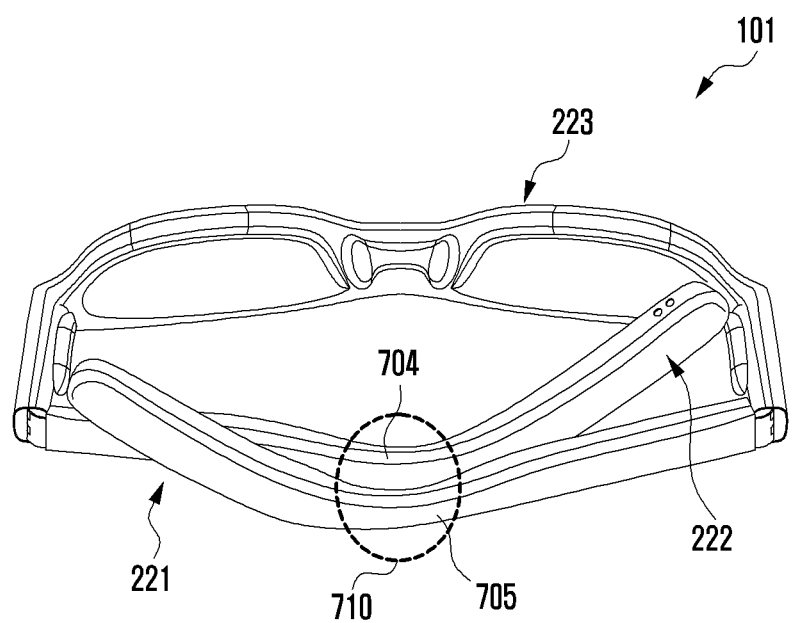
FIG. 19 illustrates an area in which the sensor of the wearable device according to an embodiment is mounted.

FIG. 19 illustrates an area where a sensor of the wearable device is mounted according to an embodiment.

FIG. 19 may illustrate an area 710 where a sensor (e.g., the fourth sensor 704 in FIG. 17) and a magnetic substance (e.g., the first magnetic substance 705) of the wearable device 101-3 overlap. Locations where the sensor (e.g., the third sensor 703 and/or the fourth sensor 704 in FIGS. 17 and/or 18) and the magnetic substance (e.g., the first magnetic substance 705 and/or the second magnetic substance 706 in FIGS. 17 and/or 18) included in a wearable device (e.g., the wearable device 101-3, 101-4 in FIGS. 17 and/or 18) are disposed and the folding order of leg members (e.g., the first leg member 221 and the second leg member 222) may be various. However, in this document, description is given for an example where leg members have been folded in the folding order of the second leg member 222 and then the first leg member 221. According to an embodiment, the sensor (e.g., the fourth sensor 704) and the magnetic substance (e.g., the first magnetic substance 705) may be disposed at the area 710, and they may overlap when the plurality of leg members (e.g., the first leg member 221 and the second leg member 222) are folded. According to an embodiment, the sensor (e.g., the fourth sensor 704) and the magnetic substance (e.g., the first magnetic substance 705) may be disposed to face each other when the plurality of leg members (e.g., the first leg member 221 and the second leg member 222) are folded. The sensor (e.g., the fourth sensor 704) may detect movement (e.g., the folding order) of leg members (e.g., the first leg member 221 and the second leg member 222) by detecting the magnetic field caused by the magnetic substance (e.g., the first magnetic substance 705) that is present at a short distance away.

Figure 20:
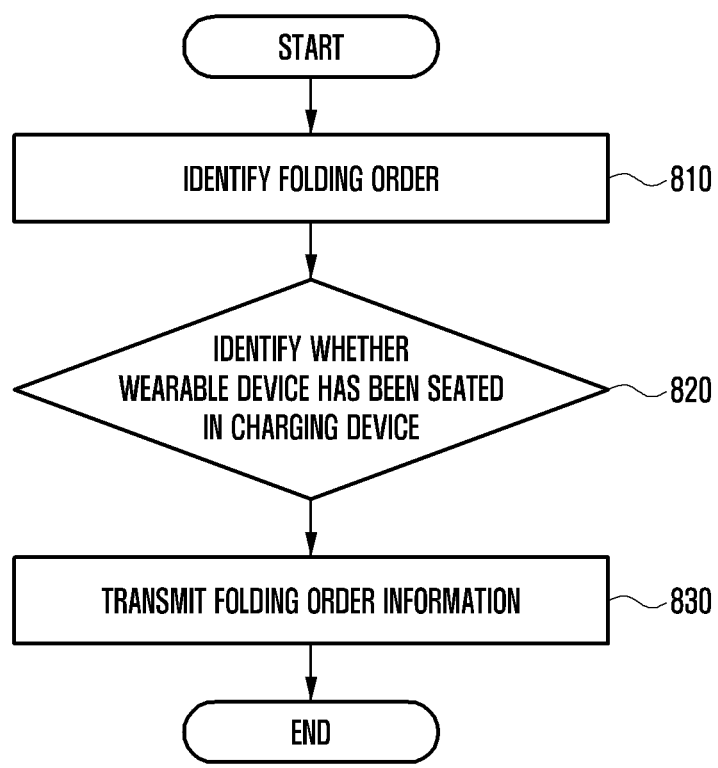
FIG. 20 is an operating flowchart based on a folding order of the leg members of the wearable device according to an embodiment.

FIG. 20 is an operating flowchart of the wearable device based on a folding order of the leg members of the wearable device according to an embodiment.

With reference to FIG. 20, operations 810, 820, and 830 of the wearable device (e.g., the wearable device 101 in FIG. 1) according to an embodiment may be described as a series of operations performed by a processor (e.g., the processor 120 in FIG. 1). The order of the operations 810, 820, and 830 shown in FIG. 20 is not limiting.

With reference to operation 810, the processor 120 of the wearable device 101 may identify a folding order. The folding order may be information about the order of the folding of the plurality of leg members (e.g., the first leg member 221 and the second leg member 222 in FIG. 2) included in the wearable device 101. According to an embodiment, the first leg member 221 and the second leg member 222 may be sequentially folded. For example, the folding order may include the order of the first leg member 221 and then the second leg member 222 or the order of the second leg member 222 and then the first leg member 221. According to an embodiment, the processor 120 of the wearable device 101 may detect movement of a leg member (e.g., the first leg member 221 and/or the second leg member 222) by using a sensor (e.g., the sensor module 176 in FIG. 1, the first sensor 701 or the second sensor 702 in FIG. 16, the third sensor 703 and/or the fourth sensor 704 in FIGS. 17 and/or 18). According to an embodiment, the processor 120 may detect acceleration and/or movement direction of the first leg member 221 and/or the second leg member 222 by using a sensor (e.g., the first sensor 701 and/or the second sensor 702 in FIG. 16). According to an embodiment, the sensor (e.g., the first sensor 701 and/or the second sensor 702 in FIG. 16) may include an acceleration sensor and/or a gyro sensor. The processor 120 may detect a change in the acceleration and/or movement of the first leg member 221 and/or the second leg member 222. The processor 120 may identify the folding order of the leg members of the wearable device 101 based on the change in the acceleration and/or movement of the first leg member 221 and/or the second leg member 222. According to an embodiment, the processor 120 may detect movement of the first leg member 221 and/or the second leg member 222 by using a sensor (e.g., the third sensor 703 and/or the fourth sensor 704 in FIGS. 17 and/or 18). According to an embodiment, the sensor (e.g., the third sensor 703 and/or the fourth sensor 704 in FIGS. 17 and/or 18) may include a magnetic field sensor. The processor 120 may identify information on the change in the magnetic field, which is detected by the magnetic field sensor, and may identify the folding order of the leg members of the wearable device 101. According to an embodiment, the processor 120 may store folding order information about the identified folding order in a memory (e.g., the memory 130 in FIG. 1).

With reference to operation 820, the processor 120 of the wearable device 101 may identify whether the wearable device 101 has been seated in the charging device 501. According to an embodiment, the processor 120 of the wearable device 101 may identify whether the wearable device 101 has been seated in a charging device (e.g., the charging device 501 in FIG. 4) by using a sensor (e.g., the sensor module 176 in FIG. 1). According to an embodiment, the wearable device 101 may establish a communication connection with the charging device 501. by using a communication module (e.g., the communication module 190 in FIG. 1). According to an embodiment, the processor 120 may receive, from the charging device 501, information about whether the wearable device 101 has been seated in the charging device 501. When identifying that the wearable device 101 has been seated in the charging device 501, the processor 120 may perform operation 830. According to an embodiment, when identifying that the wearable device 101 has not been seated in the charging device 501, the processor 120 may perform operation 810 or operation 820 again or may remain in a standby state.

With reference to operation 830, the processor 120 of the wearable device 101 may transmit folding order information. According to an embodiment, the processor 120 may transmit the folding order information to the charging device 501.

Figure 21:
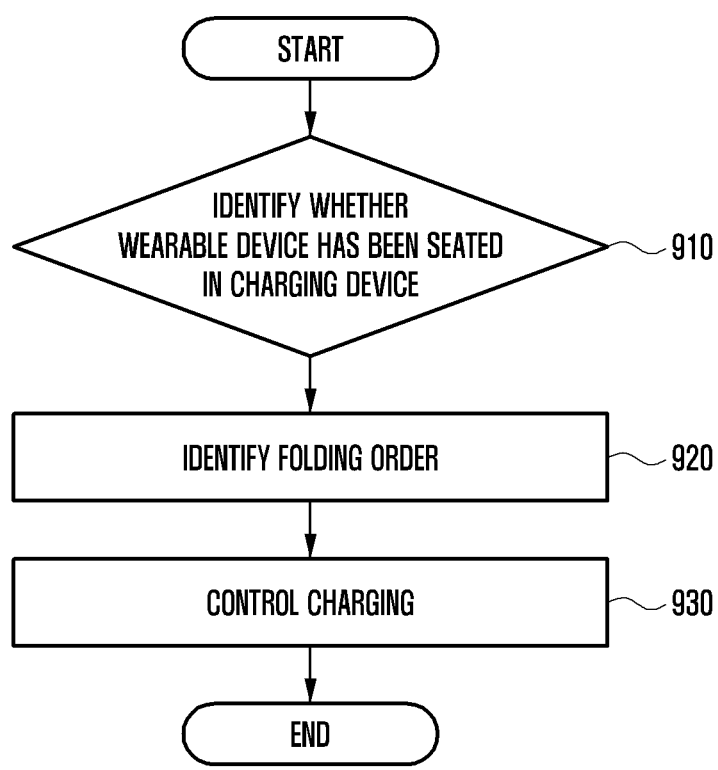
FIG. 21 is an operating flowchart of the charging device based on a folding order according to an embodiment.

FIG. 21 is an operating flowchart of the charging device based on a folding order of the leg members of the wearable device according to an embodiment.

With reference to FIG. 21, operations 910, 920, and 930 of a charging device (e.g., the charging device 501 in FIG. 4) according to an embodiment may be described as a series of operations performed by a processor (e.g., the processor 580 in FIG. 4). The order of the operations 910, 920, and 930 performed by the processor 580 shown in FIG. 21 is not limiting.

With reference to operation 910, the processor 580 of the charging device 501 may identify whether a wearable device (e.g., the wearable device 101 in FIG. 1) has been seated in the charging device 501. According to an embodiment, the charging device 501 may include a sensor (e.g., the sensor module 520 in FIG. 4). According to an embodiment, the processor 580 may identify whether the wearable device 101 has been seated in the charging device 501 by using the sensor module 520. The sensor module 520 may include a pressure sensor, a proximity sensor, an illuminance sensor and/or a magnetic sensor, for example. According to an embodiment, the pressure sensor may detect an object (e.g., the wearable device 101 in FIG. 1) coming into contact with at least some area (e.g., the support part 650 in FIG. 5) of the charging device 501. According to an embodiment, the proximity sensor may detect an object (e.g., the wearable device 101 in FIG. 1) adjacent to the charging device 501. The illuminance sensor may measure brightness within (e.g., the first space 613 in FIG. 5) the charging device 501. According to an embodiment, the processor 580 may identify the degree of brightness within the charging device 501 by using the illuminance sensor, and may detect whether an external electronic device (e.g., the wearable device 101 in FIG. 1) has been seated in the charging device 501 and/or whether the charging device 501 has been opened or closed based on the degree of brightness. For example, when internal brightness is dark, the processor 580 may identify that the charging device 501 is closed. Furthermore, for example, when internal brightness is bright, the processor 580 may identify that the charging device 501 is opened. Furthermore, for example, when a change in internal brightness is detected in the state in which the charging device 501 has been opened, the processor 580 may identify that an external electronic device (e.g., the wearable device 101 in FIG. 2) has been seated in or detached from the charging device 501. According to an embodiment, the processor 580 may detect a change in the magnetic field within the charging device 501 by using the magnetic sensor, and may identify whether an external electronic device (e.g., the wearable device 101 in FIG. 1) has been seated. According to an embodiment, the processor 580 of the charging device 501 may identify, from the wearable device 101, whether the wearable device 101 has been seated in the charging device 501. The processor 580 of the charging device 501 may establish a communication connection with the wearable device 101 by using a communication module (e.g., the communication module 510 in FIG. 4). According to an embodiment, the processor 580 may receive, from the wearable device 101, information about whether the wearable device 101 has been seated in the charging device 501 by controlling the communication module 510, and may identify whether the wearable device 101 has been seated in the charging device 501.

With reference to operation 920, the processor 580 of the charging device 501 may identify the folding order of the leg members of the wearable device 101. According to an embodiment, the processor 580 may determine which leg member of the wearable device 101 seated in the charging device 501 is closer (e.g., the first leg member 221 and/or the second leg member 222 in FIG. 2) by using a sensor (e.g., a magnetic field sensor or a proximity sensor) included in the sensor module 520, and may detect the folding order. According to an embodiment, the processor 580 may receive folding order information from the wearable device 101 by using the communication module 510, and may identify a folding order. According to an embodiment, when the wearable device 101 is seated in the charging device 501, the processor 580 may identify which reception antenna (e.g., the first reception antenna 250-1 or the second reception antenna 250-2 in FIG. 2) included in leg members (e.g., the first leg member 221 or the second leg member 222 in FIG. 2) of the wearable device 101 is closer to the corresponding transmission antenna (e.g., the first transmission antenna 661 and/or the second transmission antenna 662 in FIG. 5), and which one is farther away. For example, the processor 580 may identify a change in the magnetic field, which is detected in each transmission antenna (e.g., the first transmission antenna 661 and/or the second transmission antenna 662 in FIG. 5), and may identify which reception antenna is closer to the corresponding transmission antenna based on the identified change in the magnetic field. The processor 580 may identify the folding order of the leg members of the wearable device 101 by identifying the closer or nearer reception antenna.

With reference to operation 930, the processor 580 of the charging device 501 may control charging. According to an embodiment, the processor 580 may control charging based on the folding order. According to an embodiment, the processor 580 may move at least some (e.g., the support part 650 in FIG. 5) of the components of the charging device 501 by controlling the driving part. According to an embodiment, the processor 580 may control charging by moving the support part 650 based on the folding order. The processor 580 may rotate and move or tilt and move the support part 650. For example, when the wearable device 101 is in the folding state in the folding order of the second leg member 222 and then the first leg member 221, the processor 580 may counterclockwise rotate and move the support part 650. Furthermore, for example, when the wearable device 101 is in the folding state in the folding order of the second leg member 222 and then the first leg member 221, the processor 580 may tilt and move the support part 650 so that the second transmission antenna 662 is moved upward (e.g., the +z axis direction in FIG. 7) and the first transmission antenna 661 is moved downward (e.g., the −z axis direction in FIG. 7). The support part 650 may be rotated and moved and/or tilted and moved, so that the distance between the first transmission antenna 661 and the first reception antenna 250-1 and the distance between the second transmission antenna 662 and the second reception antenna 250-2 can be substantially identically maintained. Furthermore, for example, when the wearable device 101 is in the folding order of the first leg member 221 and then the second leg member 222, the processor 580 may clockwise rotate and move the support part 650. Furthermore, for example, when the wearable device 101 is in the folding order of the first leg member 221 and then the second leg member 222, the processor 580 may tilt and move the support part 650 so that the first transmission antenna 661 is moved upward (e.g., the +z axis direction in FIG. 7) and the second transmission antenna 662 is moved downward (e.g., the −z axis direction in FIG. 7). The support part 650 may be rotated and moved and/or tilted and moved, so that the distance between the first transmission antenna 661 and the first reception antenna 250-1 and the distance between the second transmission antenna 662 and the second reception antenna 250-2 can be substantially identically maintained.

According to an embodiment, the processor 580 may control transmission intensity of at least one antenna (e.g., the first antenna 571 and/or the second antenna 572 in FIG. 4) that wirelessly transmits power. According to an embodiment, the distance between a reception antenna (e.g., the first antenna 341 and/or the second antenna 342 in FIG. 1) included in the wearable device 101 and a transmission antenna (e.g., the first antenna 571 and/or the second antenna 572 in FIG. 4) of the charging device 501 may be different depending on the folding order of the leg members of the wearable device 101. Accordingly, the processor 580 may control transmission intensity to be increased with respect to a reception antenna having a longer distance from a transmission antenna and transmission intensity to be decreased with respect to a reception antenna having a shorter distance from a transmission antenna by considering a distance difference based on a folding order. According to an embodiment, the processor 580 may increase the intensity of the magnetic field radiated to a transmission antenna (e.g., the first antenna 571 and/or the second antenna 572 in FIG. 4) and that is disposed relative far from the corresponding reception antenna (e.g., the first antenna 341 and/or the second antenna 342 in FIG. 1) of the wearable device 101, based on a folding order. With reference to Table 1, Table 1 is related to an embodiment in which the processor 580 controls the intensity of wireless charging based on the folding order. The case where the wearable device 101 is in the folding order of the first leg member 221 and then the second leg member 222 may be a first folding order. The case where the wearable device 101 is in the folding order of the second leg member 222 and then the first leg member 221 may be a second folding order. The default value may be predetermined magnetic field radiation intensity. With reference to Table 1, the numerical values in Table 1 are only for one example.

TABLE 1

| FOLDING ORDER | METHOD OF CONTROLLING CHARGING CURRENT |
|---|---|
| First folding order | First antenna 571: Default<br>Second antenna 572: Default* 120% |
| Second folding order | First antenna 571: Default*120%<br>Second antenna 572: Default |

According to an embodiment, the processor 580 may receive, from the wearable device 101, information on the charging level of at least one battery (e.g., the first battery 333 and/or the second battery 334 in FIG. 1) included in the wearable device 101, and may control charging based on the charging level of the battery. Table 2 illustrates values of magnetic field radiation intensity using transmission antennas of the processor 580 according to battery capacities of the wearable device 101 in the case of the first folding order (e.g., the folding order of the first leg member 221 and the second leg member 222).

TABLE 2

| BATTERY CAPACITY | 0 TO 50% | 51 TO 80% | 81 TO 100% |
|---|---|---|---|
| Radiation intensity of first antenna 571 | Default*120% | Default*110% | Default |
| Radiation intensity of second antenna 572 | Default | Default | Default*90% |

According to an embodiment, the processor 580 may control the wearable device 101 to be charged using only one of transmission antennas (e.g., the first antenna 571 and the second antenna 572 in FIG. 4) of the charging device 501. For example, the processor 580 may control the wearable device 101 to be charged using only the transmission antenna that is closest to the corresponding reception antenna, and may control the total charging speed of the wearable device 101 by further increasing radiation intensity (e.g., the intensity of a current flowing into an antenna). Table 3 is a table illustrating a case where the processor 580 performs wireless charging by using only one of a plurality of transmission antennas.

TABLE 3

| FOLDING ORDER | DISTANCE BETWEEN WIRELESS CHARGING ANTENNAS | METHOD OF CONTROLLING CHARGING CURRENT |
|---|---|---|
| First folding order | First antenna 571: near<br>second antenna 572: far | Only first antenna is operated, and charging current is doubled |
| Second folding order | First antenna 571: far<br>second antenna 572: near | Only second antenna is operated, and charging current is doubled |

According to an embodiment, the processor 580 may control a transmission antenna (e.g., the first antenna 571 and/or the second antenna 572 in FIG. 4) so that the charging speed of the wearable device 101 is constantly maintained regardless of the folding order of the wearable device.

An electronic device (e.g., the charging device 501) according to an embodiment disclosed in this document may include a housing (e.g., the housing 610) forming a first space (e.g., the first space 613) configured to seat an external electronic device (e.g., the wearable device 101) and a second space (e.g., the second space 614), a battery (e.g., the battery 550) storing power, a support part (e.g., the support part 650) disposed within the first space and configured to support the external electronic device when the external electronic device is seated in the electronic device, a first antenna (e.g., the first transmission antenna 661) and a second antenna (e.g., the second transmission antenna 662) disposed in the support part, a third antenna (e.g., the third antenna 640) disposed in the second space and configured to receive a first magnetic field from the outside of the housing and to supply power to the battery. The battery may be disposed in the second space, and may be electrically connected to the first antenna, the second antenna, and the third antenna. The battery may radiate a second magnetic field to at least some area of the first space by supplying power to at least one of the first antenna and the second antenna.

According to an embodiment, the first space may include at least a first area (e.g., the first area 613-1) and a second area (e.g., the second area 613-2). The support part may include a first holding part (e.g., the first holding part 651) disposed at a location corresponding to the first area and a second holding part (e.g., the second holding part 652) disposed at a location corresponding to the second area. The first antenna may be disposed in the first holding part of the support part, and the second antenna may be disposed in the second holding part of the support part.

According to an embodiment, the first antenna may be disposed to radiate at least a part of the second magnetic field toward the first area. The second antenna may be disposed to radiate at least a part of the second magnetic field toward the second area.

According to an embodiment, the support part may be disposed to move within the first space.

According to an embodiment, the support part may be configured to be capable of at least one of a rotation movement, a tilt movement, and an up and down movement.

According to an embodiment, the support part may include a first holding part and a second holding part spaced apart from the first holding part. The first holding part and the second holding part may be configured to move independently of each other.

According to an embodiment, when the external electronic device is seated in the first space, the support part may be disposed to come into contact with the external electronic device. The support part may be weighted and moved by the contact.

According to an embodiment, the electronic device may include a connection part (e.g., the connection part 653) disposed in the housing and configured to connect the housing and the support part.

According to an embodiment, the connection part may include at least one of a rotation axis, a tilt axis, and an elastic member.

An electronic device (e.g., the charging device 501) according to an embodiment disclosed in this document may include a housing (e.g., the housing 610) forming a first space (e.g., the first space 613) configured to seat an external electronic device (e.g., the wearable device 101), the external electronic device including a first leg member (e.g., the first leg member 221) and a second leg member (e.g., the second leg member 222) capable of being sequentially folded, a battery (e.g., the battery 550) configured to store power, a first antenna (e.g., the first transmission antenna 661) and a second antenna (e.g., the second transmission antenna 662) disposed in the first space of the housing and configured to receive power from the battery and radiate a first magnetic field, a third antenna (e.g., the third antenna 640) configured to receive a second magnetic field from the outside of the housing and to supply power to the battery, and a processor (e.g., the processor 580) operatively connected to the first antenna, the second antenna, the third antenna, and the battery. The processor may be configured to identify whether the external electronic device has been seated in the electronic device, identify a folding order of the first leg member and the second leg member included in the external electronic device, and control charging based on the folding order.

According to an embodiment, the electronic device may further include a sensor module (e.g., the sensor module 520). The processor may be configured to detect whether the external electronic device has been seated in the electronic device by using the sensor module.

According to an embodiment, the electronic device may further include a sensor module. The processor may be configured to detect the folding order by using the sensor module.

According to an embodiment, the control of the charging may include an operation of controlling power supplied to the first antenna and power supplied to the second antenna.

According to an embodiment, the electronic device may further include a support part (e.g., the support part 650) in which the first antenna and the second antenna are disposed and configured to support the external electronic device, and a driving part connected to the support part and configured to deliver power to the support part. The processor may be configured to control the driving part based on the folding order and move the support part.

According to an embodiment, the electronic device may further include a communication module configured to establish a communication connection (e.g., the communication module 510) with the external electronic device. The processor may be configured to receive, from the external electronic device, at least one of seating information regarding whether the external electronic device has been seated in the electronic device and folding information regarding the folding order by using the communication module.

An electronic device (e.g., the wearable device 101) according to an embodiment disclosed in this document may include a main body part (e.g., the main body part 223), a pair of lenses (e.g., the first glass 220 and the second glass 230) supported by the main body part, at least one display module (e.g., the first display module 351, the second display module 353) disposed in the main body part, a first leg member (e.g., the first leg member 221) rotatably connected to the main body part, a second leg member (e.g., the second leg member 222) rotatably connected to the main body part and spaced apart from the first leg member, a communication module (e.g., the communication module 190) configured to establish a communication connection with an external electronic device, a sensor module (e.g., the sensor module 176) including one or more sensors, and a processor (e.g., the processor 120) operatively connected to the communication module and the sensor module. The first leg member and the second leg member may be disposed so that one of the first leg member and the second leg member is first rotated and folded and the other of the first leg member and the second leg member is then sequentially rotated and folded. The processor may be configured to generate folding order information by detecting a folding order of the first and second leg members by using the sensor module based on the first leg member and the second leg member being rotated and folded and to transmit the folding order information to the external electronic device.

According to an embodiment, the electronic device may further include at least one battery (e.g., the first battery 333, the second battery 334), and at least one antenna (e.g., the first reception antenna 250-1, the second reception antenna 250-2) disposed in at least one of the first leg member and the second leg member, electrically connected to the at least one battery, and configured to receive a magnetic field and to supply power to the at least one battery.

According to an embodiment, the sensor module may include a first sensor (e.g., the first sensor 701) and a second sensor (e.g., the second sensor 702). The first sensor may be disposed in the first leg member. The second sensor may be disposed in the second leg member.

According to an embodiment, the first leg member may include a first overlap area (e.g., the overlap area 710) where the first leg member overlaps the second leg member when the first leg member and the second leg member are folded. The second leg member may include a second overlap area (e.g., the overlap area 710) where the second leg member overlaps the first leg member when the first leg member and the second leg member are folded. The sensor module may be disposed in at least one of the first overlap area and the second overlap area.

According to an embodiment, the sensor module may include at least one of a Hall sensor, an acceleration sensor, and a gyro sensor.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RANI, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing forming a first space configured to seat an external electronic device, the external electronic device comprising a first leg member and a second leg member capable of being sequentially folded;
a battery configured to store power,
a first antenna and a second antenna disposed in the first space of the housing and configured to receive power from the battery and radiate a first magnetic field;
a third antenna configured to receive a second magnetic field from outside of the housing and to supply power to the battery; and
a processor operatively connected to the first antenna, the second antenna, the third antenna, and the battery,
wherein the processor is configured to identify whether the external electronic device has been seated in the electronic device, identify a folding order of the first leg member and the second leg member included in the external electronic device, and control charging based on the folding order.

2. The electronic device of claim 1, further comprising a sensor module,
wherein the processor is configured to detect whether the external electronic device has been seated in the electronic device by using the sensor module.

3. The electronic device of claim 1, further comprising a sensor module,
wherein the processor is configured to detect the folding order by using the sensor module.

4. The electronic device of claim 1, wherein the control of the charging comprises an operation of controlling power supplied to the first antenna and power supplied to the second antenna.

5. The electronic device of claim 1, further comprising:
a support part in which the first antenna and the second antenna are disposed and configured to support the external electronic device; and
a driving part connected to the support part and configured to deliver power to the support part,
wherein the processor is configured to control the driving part based on the folding order and move the support part.

6. The electronic device of claim 1, further comprising a communication module configured to establish a communication connection with the external electronic device,
wherein the processor is configured to receive, from the external electronic device, seating information regarding whether the external electronic device has been seated in the electronic device and/or folding information regarding the folding order by using the communication module.

* * * * *